(12) United States Patent
Bennett

(10) Patent No.: US 8,452,929 B2
(45) Date of Patent: May 28, 2013

(54) METHOD AND SYSTEM FOR STORAGE OF DATA IN NON-VOLATILE MEDIA

(75) Inventor: Jon C. R. Bennett, Sudbury, MA (US)

(73) Assignee: Violin Memory Inc., Mountain View, CA (US)

(*) Notice: Subject to any disclaimer, the term of this patent is extended or adjusted under 35 U.S.C. 154(b) by 486 days.

(21) Appl. No.: 12/273,410

(22) Filed: Nov. 18, 2008

(65) Prior Publication Data
US 2009/0150599 A1 Jun. 11, 2009

Related U.S. Application Data

(63) Continuation of application No. 11/405,083, filed on Apr. 17, 2006, and a continuation-in-part of application No. 12/079,364, filed on Mar. 26, 2008.

(60) Provisional application No. 61/003,897, filed on Nov. 21, 2007, provisional application No. 60/674,189, filed on Apr. 21, 2005, provisional application No. 60/698,626, filed on Jul. 11, 2005, provisional application No. 60/920,737, filed on Mar. 29, 2007.

(51) Int. Cl.
*G06F 13/00* (2006.01)
(52) U.S. Cl.
USPC .......................... 711/162; 711/156
(58) Field of Classification Search
USPC .................................. 711/156, 162
See application file for complete search history.

(56) References Cited

U.S. PATENT DOCUMENTS

| | | | |
|---|---|---|---|
| 3,728,679 A | 4/1973 | Mcintosh | |
| 3,970,798 A | 7/1976 | Epenoy et al. | |
| 4,128,882 A | 12/1978 | Dennis | |
| 4,240,143 A | 12/1980 | Besemer et al. | |
| 4,263,651 A | 4/1981 | Donath | |
| 4,322,849 A | 3/1982 | Calabrese | |
| 4,323,849 A | 4/1982 | Smith | |
| 4,363,094 A | 12/1982 | Kaul et al. | |
| 4,383,314 A | 5/1983 | Tam | |
| 4,386,323 A | 5/1983 | Jansen | |

(Continued)

FOREIGN PATENT DOCUMENTS

| | | |
|---|---|---|
| EP | 1 369 767 A2 | 12/2003 |
| WO | WO 99/30240 | 6/1999 |
| WO | WO 99/41667 | 8/1999 |

OTHER PUBLICATIONS

Despaux, 0., "DDR SDRAM Controller Using Virtex-4 FPGA Devices," 2004 Xilinx, Inc., XAPP709 (v1.0) Sep. 10, 2004, pp. 1-9.

(Continued)

*Primary Examiner* — Reba I Elmore
(74) *Attorney, Agent, or Firm* — Brinks Hofer Gilson & Lione

(57) ABSTRACT

A system and method for managing the storage of data in non-volatile memory is described. In an aspect, the data may be described by metadata and a transaction log file that are checkpointed from a volatile memory into the non-volatile memory. Actions that take place between the last checkpointing of a metadata segment and log file segment are discovered by scanning the non-volatile memory blocks, taking account of a record of the highest sector in each block that is known to have been recorded. Any later transactions are discovered and used to update the recovered metadata so that the metadata correctly represents the stored data.

44 Claims, 23 Drawing Sheets

U.S. PATENT DOCUMENTS

| | | |
|---|---|---|
| 4,543,630 A | 9/1985 | Neches |
| 4,558,455 A | 12/1985 | Epenoy et al. |
| 4,701,756 A | 10/1987 | Burr |
| 4,703,451 A | 10/1987 | Calabrese |
| 4,756,011 A | 7/1988 | Cordell |
| 4,805,195 A | 2/1989 | Keegan |
| 4,843,288 A | 6/1989 | Volz |
| 4,845,709 A | 7/1989 | Matsumoto et al. |
| 4,860,201 A | 8/1989 | Stolfo et al. |
| 4,881,165 A | 11/1989 | Sager et al. |
| 4,910,669 A | 3/1990 | Gorin et al. |
| 4,922,409 A | 5/1990 | Schoellkopf et al. |
| 5,041,964 A | 8/1991 | Cole et al. |
| 5,053,942 A | 10/1991 | Srini |
| 5,128,810 A | 7/1992 | Halford |
| 5,200,746 A | 4/1993 | Yoshifuji |
| 5,283,877 A | 2/1994 | Gastinel |
| 5,285,441 A | 2/1994 | Bansal |
| 5,313,501 A | 5/1994 | Thacker |
| 5,365,487 A | 11/1994 | Patel |
| 5,379,262 A | 1/1995 | Okamoto et al. |
| 5,467,040 A | 11/1995 | Nelson et al. |
| 5,507,029 A | 4/1996 | Granato |
| 5,513,377 A | 4/1996 | Capowski |
| 5,621,774 A | 4/1997 | Ishibashi |
| 5,687,183 A | 11/1997 | Chesley |
| 5,828,253 A | 10/1998 | Murayama |
| 5,872,959 A | 2/1999 | Nguyen |
| 5,889,714 A | 3/1999 | Schumann |
| 5,920,704 A | 7/1999 | Olnowich |
| 5,923,830 A | 7/1999 | Fuchs et al. |
| 5,960,034 A | 9/1999 | Lo |
| 5,974,503 A | 10/1999 | Venkatesh et al. |
| 6,009,547 A | 12/1999 | Jaquette et al. |
| 6,031,847 A | 2/2000 | Collins |
| 6,105,144 A | 8/2000 | Wu |
| 6,118,612 A | 9/2000 | Judd |
| 6,134,167 A | 10/2000 | Atkinson |
| 6,138,185 A | 10/2000 | Nelson |
| 6,151,289 A | 11/2000 | Rope et al. |
| 6,157,229 A | 12/2000 | Yoshikawa |
| 6,185,134 B1 | 2/2001 | Tanaka |
| 6,185,654 B1 | 2/2001 | Van Doren |
| 6,208,667 B1 | 3/2001 | Caldara |
| 6,226,708 B1 | 5/2001 | Mcgoldrick |
| 6,237,052 B1 | 5/2001 | Stolowitz |
| 6,301,244 B1 | 10/2001 | Huang |
| 6,310,814 B1 | 10/2001 | Hampel |
| 6,317,352 B1 | 11/2001 | Halbert et al. |
| 6,321,345 B1 | 11/2001 | Mann |
| 6,334,167 B1 | 12/2001 | Gerchman |
| 6,335,647 B1 | 1/2002 | Nagano |
| 6,335,930 B1 | 1/2002 | Lee |
| 6,345,321 B1 | 2/2002 | Litaize et al. |
| 6,356,610 B1 | 3/2002 | Ott |
| 6,359,815 B1 | 3/2002 | Sato |
| 6,369,605 B1 | 4/2002 | Bonella et al. |
| 6,370,200 B1 | 4/2002 | Takahashi |
| 6,417,713 B1 | 7/2002 | DeRyckere |
| 6,425,114 B1 | 7/2002 | Chan |
| 6,442,644 B1 | 8/2002 | Gustavson et al. |
| 6,445,719 B1 | 9/2002 | Schneider et al. |
| 6,446,174 B1 | 9/2002 | Dow |
| 6,449,667 B1 | 9/2002 | Ganmukhi et al. |
| 6,473,827 B2 | 10/2002 | McMillen |
| 6,493,205 B2 | 12/2002 | Bauer |
| 6,493,250 B2 | 12/2002 | Halbert et al. |
| 6,502,161 B1 | 12/2002 | Perego et al. |
| 6,539,463 B1 | 3/2003 | Kuwata |
| 6,553,450 B1 | 4/2003 | Dodd et al. |
| 6,557,110 B2 | 4/2003 | Sakamoto |
| 6,567,311 B2 | 5/2003 | Ishii |
| 6,591,339 B1 | 7/2003 | Horst et al. |
| 6,611,518 B1 | 8/2003 | Ngo |
| 6,625,687 B1 | 9/2003 | Halbert et al. |
| 6,636,932 B1 | 10/2003 | Regev |
| 6,636,993 B1 | 10/2003 | Koyanagi |
| 6,647,027 B1 | 11/2003 | Gasparik |
| 6,658,509 B1 | 12/2003 | Bonella et al. |
| 6,667,927 B2 | 12/2003 | Jones |
| 6,678,783 B2 | 1/2004 | Ozawa |
| 6,681,338 B1 | 1/2004 | Kollipara |
| 6,697,974 B2 | 2/2004 | Craft |
| 6,735,397 B2 | 5/2004 | Herrity |
| 6,799,235 B2 | 9/2004 | Bormann et al. |
| 6,803,872 B2 | 10/2004 | Deryckere |
| 6,807,377 B1 | 10/2004 | Watanabe |
| 6,833,618 B2 | 12/2004 | Ono et al. |
| 6,871,253 B2 | 3/2005 | Greef et al. |
| 6,874,097 B1 | 3/2005 | Aliahmad |
| 6,882,082 B2 | 4/2005 | Greef et al. |
| 6,904,050 B2 | 6/2005 | Chao |
| 6,928,571 B1 | 8/2005 | Bonella et al. |
| 6,937,681 B2 | 8/2005 | Watanabe |
| 6,961,347 B1 | 11/2005 | Bunton et al. |
| 6,983,354 B2 | 1/2006 | Jeddeloh |
| 7,012,811 B1 | 3/2006 | Jiang et al. |
| 7,013,361 B2 | 3/2006 | Liron |
| 7,064,992 B2 | 6/2006 | Bell |
| 7,065,101 B2 | 6/2006 | Ziegler |
| 7,085,950 B2 | 8/2006 | Ehmann |
| 7,111,140 B2 | 9/2006 | Estakhri |
| 7,113,012 B2 | 9/2006 | Amin |
| 7,123,660 B2 | 10/2006 | Haq |
| 7,130,317 B2 | 10/2006 | Annadurai |
| 7,139,347 B2 | 11/2006 | Fujita |
| 7,149,950 B2 | 12/2006 | Spencer |
| 7,193,429 B2 | 3/2007 | Okuyama |
| 7,200,790 B2 | 4/2007 | Sharma |
| 7,203,889 B2 | 4/2007 | Oza |
| 7,205,803 B2 | 4/2007 | Chung |
| 7,213,103 B2 | 5/2007 | Eng |
| 7,280,538 B2 | 10/2007 | Li |
| 7,304,520 B2 | 12/2007 | Cho |
| 7,328,362 B2 | 2/2008 | Chiang |
| 7,366,852 B2 | 4/2008 | Hung |
| 7,430,728 B1 | 9/2008 | Rahut |
| 7,433,441 B2 | 10/2008 | Jenkins |
| 7,490,189 B2 | 2/2009 | Eberle |
| 7,525,356 B2 | 4/2009 | Hui |
| 7,551,640 B1 | 6/2009 | Klecka |
| 7,609,695 B2 | 10/2009 | Zhu |
| 7,643,517 B2 | 1/2010 | Annadurai |
| 7,653,776 B2 | 1/2010 | Cornelius |
| 7,668,271 B2 | 2/2010 | Kim |
| 7,668,272 B1 | 2/2010 | Obeidat |
| 7,734,867 B1 | 6/2010 | Keeton |
| 7,751,713 B2 | 7/2010 | Perkins |
| 7,817,767 B2 | 10/2010 | Tell |
| 2001/0039601 A1 | 11/2001 | Leung |
| 2002/0009169 A1 | 1/2002 | Watanabe |
| 2002/0084458 A1 | 7/2002 | Halbert et al. |
| 2002/0112119 A1 | 8/2002 | Halbert et al. |
| 2002/0120901 A1 | 8/2002 | Poirier |
| 2002/0124153 A1 | 9/2002 | Litaize et al. |
| 2003/0001880 A1 | 1/2003 | Holtz |
| 2003/0018880 A1 | 1/2003 | Litaize et al. |
| 2003/0019327 A1 | 1/2003 | Fujimoto |
| 2003/0046489 A1 | 3/2003 | Yagi et al. |
| 2003/0058021 A1 | 3/2003 | Lee et al. |
| 2003/0061447 A1 | 3/2003 | Perego et al. |
| 2003/0084397 A1 | 5/2003 | Peleg |
| 2003/0105928 A1 | 6/2003 | Ash et al. |
| 2003/0117172 A1 | 6/2003 | Wu et al. |
| 2003/0120895 A1 | 6/2003 | Litaize et al. |
| 2003/0163606 A1 | 8/2003 | Fukaishi |
| 2003/0193927 A1 | 10/2003 | Hronik |
| 2003/0208511 A1 | 11/2003 | Earl et al. |
| 2003/0212858 A1 | 11/2003 | Apperley |
| 2003/0236939 A1 | 12/2003 | Klocland et al. |
| 2004/0004897 A1 | 1/2004 | Kang |
| 2004/0073767 A1 | 4/2004 | Johnson |
| 2004/0117569 A1 | 6/2004 | Kyung |
| 2004/0122985 A1 | 6/2004 | Parra et al. |
| 2004/0153817 A1 | 8/2004 | Norman et al. |
| 2004/0153902 A1 | 8/2004 | Machado |
| 2004/0230718 A1 | 11/2004 | Polzin et al. |

| | | | |
|---|---|---|---|
| 2004/0243769 A1 | 12/2004 | Frame et al. |
| 2004/0256638 A1 | 12/2004 | Perego et al. |
| 2005/0005184 A1 | 1/2005 | Lindt |
| 2005/0007805 A1 | 1/2005 | Ware et al. |
| 2005/0010737 A1 | 1/2005 | Ware et al. |
| 2005/0060483 A1 | 3/2005 | Azuma |
| 2005/0071693 A1 | 3/2005 | Chun et al. |
| 2005/0078506 A1 | 4/2005 | Rao |
| 2005/0086549 A1 | 4/2005 | Solomon et al. |
| 2005/0111249 A1 | 5/2005 | Yagisawa |
| 2005/0146939 A1 | 7/2005 | Conley |
| 2005/0193166 A1 | 9/2005 | Johnson |
| 2005/0223269 A1 | 10/2005 | Stolowitz |
| 2005/0240743 A1 | 10/2005 | Eng |
| 2005/0246362 A1 | 11/2005 | Borland |
| 2005/0259692 A1 | 11/2005 | Zerbe |
| 2006/0136767 A1 | 6/2006 | Ma |
| 2006/0143372 A1 | 6/2006 | Walker |
| 2006/0179334 A1 | 8/2006 | Brittain |
| 2006/0187715 A1 | 8/2006 | Narvaez et al. |
| 2006/0253721 A1 | 11/2006 | Johnson |
| 2006/0277310 A1 | 12/2006 | Kalos |
| 2006/0288241 A1 | 12/2006 | Felter |
| 2007/0002663 A1 | 1/2007 | Schaefer |
| 2007/0061513 A1 | 3/2007 | Tsumagari |
| 2007/0079219 A1 | 4/2007 | Nagai et al. |
| 2007/0088754 A1 | 4/2007 | Brannon et al. |
| 2007/0101075 A1 | 5/2007 | Jeddeloh |
| 2007/0113029 A1 | 5/2007 | Bennett et al. |
| 2007/0124532 A1 | 5/2007 | Bennett |
| 2007/0162516 A1 | 7/2007 | Thiel et al. |
| 2007/0279993 A1 | 12/2007 | Hemink |
| 2008/0040385 A1* | 2/2008 | Barrall et al. | 707/103 Y |
| 2008/0052446 A1 | 2/2008 | Lasser |
| 2008/0059869 A1 | 3/2008 | Brewer |
| 2008/0089135 A1 | 4/2008 | Ito |
| 2008/0168304 A1 | 7/2008 | Flynn et al. |
| 2008/0175586 A1 | 7/2008 | Perkins |
| 2008/0175589 A1 | 7/2008 | Perkins |
| 2008/0183953 A1 | 7/2008 | Flynn et al. |
| 2008/0320366 A1 | 12/2008 | Lin |
| 2009/0006886 A1 | 1/2009 | O'Connor |
| 2009/0010067 A1 | 1/2009 | Lee |
| 2009/0052892 A1 | 2/2009 | Perkins |
| 2009/0106491 A1 | 4/2009 | Piszczek |
| 2009/0147573 A1 | 6/2009 | Hemink |
| 2009/0324220 A1 | 12/2009 | Perkins |

OTHER PUBLICATIONS

Feb. 23, 2010 Non-Final Office Action, U.S. Appl. No. 11/405,083 (19 pages).
Jan. 21, 2011 Non-Final Office Action, U.S. Appl. No. 12/245,349 (20 pages).
Jul. 21, 2010 Final Office Action, U.S. Appl. No. 11/405,083 (20 pages).
Pharris, B., "The SCALE DRAM Subsystem," Massachusetts Institute of Technology, May 2004, pp. 1-79.
Response to May 19, 2010 Non-Final Office Action, U.S. Appl. No. 11/975,269, filed in the PTO on Nov. 9, 2010, 7 pages.
European Patent Office Communication from EPO application No. 07 861 460.9-7212 dated Mar. 23, 2010 (3 pages).
European Search Report from EPO application No. 08836238. 92212/2201463 dated Sep. 14, 2010 (7 pages).
May 19, 2010 Non-Final OA U.S. Appl. No. 11/075,269.
May 28, 2010 Response to European Patent Office Communication from EPO application No. 07 861460.9-2212 dated Mar. 23, 2010 (17 pages).
"Mainstream Computer Components," Lec #10 Spring 2006 May 8, 2006, pp. 1-31.
Fan, X., et al., 'Memory Controller Policies for DRAM Power Management,' ISPLED'01, Aug. 6-7, 2001, Huntington Beach, California, USA Copyright 2001 ACM 1-58113-371 May 1, 0008,6 pages.
Micron, 'Calculating Memory System Power for DDR,' 2001 Micron Technology, Inc., pp. 1-26.
Micron, "DDR2 (Point-to-Point) Features and Functionality," 2003 Micron Technology, Inc., pp. 1-14.
Micron, "DDR2 tCKE Power-Down Requirement," 2003 Micron Technology, Inc., pp. 1-3.
Micron, "Designing for High-Density DDR2 Memory," 2005 Micron Technology, Inc., pp. 1-9.
Micron, "Mobile DRAM Power-Saving Features and Power Calculations," 2005 Micron Technology, Inc., pp. 1-9.
Micron, "Mobile SDRAM Power-Saving Features," 2002 Micron Technology, Inc., pp. 1-3.
Response to Feb. 23, 2010 Non-Final Office Action, U.S. Appl. No. 11/405,083, filed in the PTO on May 12, 2010 (30 pages).
Jul. 21, 2009 Non-Final Office Action, U.S. Appl. No. 11/405,083.
Response to Jul. 21, 2009 Non-Final Office Action, U.S. Appl. No. 11/405,083, filed in the PTO on Oct. 7, 2009.
Written Opinion of the International Searching Authority from the International Search Report from PCT application No. PCT/US2008/083969 dated Apr. 30, 2009, 5 pages.
International Search Report for International Application No. PCT/US2008/083969, dated Apr. 30, 2009, 3 pages.
Written Opinion of the International Searching Authority from the International Search Report from PCT application No. PCT/US2008/074628 dated Mar. 24, 2009, 5 pages.
International Search Report for International Application No. PCT/US2008/074628, dated Mar. 24, 2009, 3 pages.
Written Opinion of the International Searching Authority from the International Search Report from PCT application No. PCT/US2008/078752 dated Mar. 31, 2009, 5 pages.
International Search Report for International Application No. PCT/US2008/078752, dated Mar. 31, 2009, 3 pages.
"Cycletrees: Flexible Interconnection Graphs for Parallel Computing", by Margus Veanes & Jonas Barklund, 36 p., UPMAIL Technical Report No. 97, Uppsala, Sweden, Feb. 21, 1995.
"Communication in X-Tree, a Modular Multiprocessor System", by C.H. Sequin, A.M.Despain, D.A. Patterson; University of California, Computer Science Division, Electrical Engineering & Computer Sciences; Berkeley, CA, p. 194-203; 1978.
"A Graph for Interconnecting Processors in Parallel Computing", by Hong Xie; Murdock University, Murdoch, W.A, 6150 Australia; Proc. ICCI'94, p. 885-901; 1994 Int. Conf. on Computing and Information, 1994.
"A High-Speed Channel Controller for the Chaos Router", by Robert Wille; p. 1-21; Dec. 8, 1992.
"The Alewife CMMU: Addressing the Multiprocessor Communications Gap", by J. Kubiatowicz, D. Chaiken, A. Agarwal; Massachusetts Institute of Technology, Laboratory for Computer Science, Cambridge, MA; p. 1-3, 1994.
"Performance Evaluation of Switch-Based Wormhole Networks", by Lionel M. Ni, Yadong Gui, Sherry Moore; 1045-9219/97—1997 IEEE; p. 462-474.
Hans-Peter Messer: "PC—Hardwarebuch" 1995, Addison-Wesley, Bonn XP002412835 pp. 31-36, pp. 580-583.
International Search Report from PCT application No. PCT/US2006/014527 dated Apr. 10, 2007 (7 pages).
Written Opinion of the International Searching Authority from the International Search Report from PCT application No. PCT/US2006/014527 dated Apr. 10, 2007 (9 pages).
International Search Report for International Application No. PCT/US2007/022316, dated Mar. 28, 2008, 3 pages.
Int_l®, "Understanding the Flash Translation Layer (FTL) Specification," Dec. 1998, Order No. 297816-002, Copyright © Intel Corporation 1997, 1998, pp. 1-20.
Graefe, G., "Write-Optimized B-Trees," Proceedings of the 30$^{th}$ VLDB Conference, Toronto, Canada, 2004, pp. 672-683.
Jeffery, C.A., "Performance Analysis of Dynamic Sparing and Error Correction Techniques for Fault Tolerance in Nanoscale Memory Structures," Thesis Presentation to the University of Florida, 2004, 104 pages.
Juonolainen, M. K., "Cand Scient Thesis," University of Oslo, 1.2. 1999, 129 pages.
Norvag, K., et al., "Log-Only Temporal Object Storage," Copyright 1997 IEEE, published in the Proceedings of DEXA'97, Sep. 1-2, 1997, Toulouse, France, 6 pages.

Sanders, D.A., et al., "Terabyte IDE RAID-5 Disk Arrays," 2003 Conference for Computing in High Energy and Nuclear Physics, LaJolla, California, Mar. 24-28, 2003, pp. 1-8.

Shirriff, K.W., "Sawmill: A Logging File System for a High-Performance RAID Disk Array," Dissertation Presentation, University of California, 1995, pp. 164.

Notification of the First Office Action dated Dec. 26, 2008 from the Patent Office of People's Republic of China for Chinese Patent Application No. 2006800130653, 7 pages.

US 6,832,284, 12/2004, Perego et al. (withdrawn)

* cited by examiner

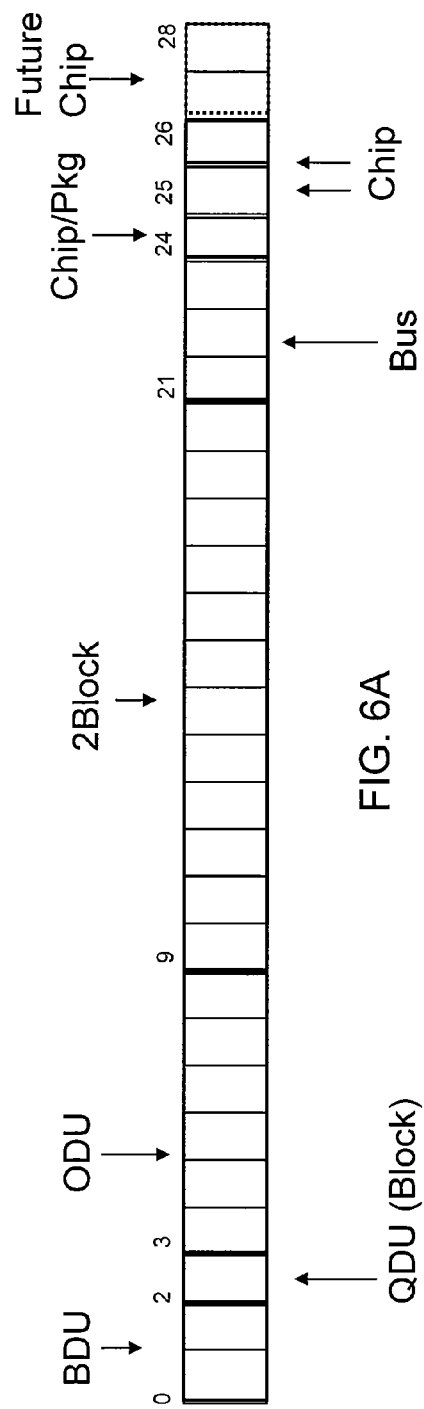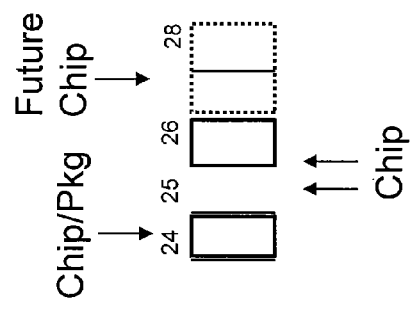
FIG. 6A
FIG. 6B

FIG. 12

| FF | | RBR Seq # | | Block Erase Count | |
|---|---|---|---|---|---|
| 0 | 3 | | 6 | 19 | 22 | 31 |

FIG. 13

| F 1 | | IBR Seq # | | Block Erase Count | |
|---|---|---|---|---|---|
| 0 | 3 | | 6 | 19 | 22 | 31 |

FIG. 16

| Bits | Field | Value |
|---|---|---|
| 0–28, 29 30 31 = S# R E S S, 0 | Physical BDU Index (PBI) | V0: BDU is in Flash |
| 0–23, 26, 29 30 31 = 0 0 1 | Cache Descriptor Index | V8: BDU is in DRAM |
| 0–15, 19, 25, 29 30 31 = 0 0 1 1 | Pattern / Type | V12: Pattern |
| 0–25, 29 30 31 = 0 1 1 1 | Reserved | V14: Unallocated |
| 0–25, 29 30 31 = 1 1 1 1 | Reserved | V15: Reserved |

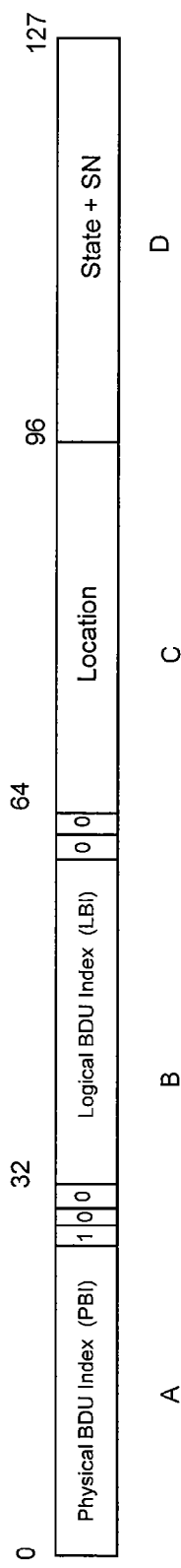
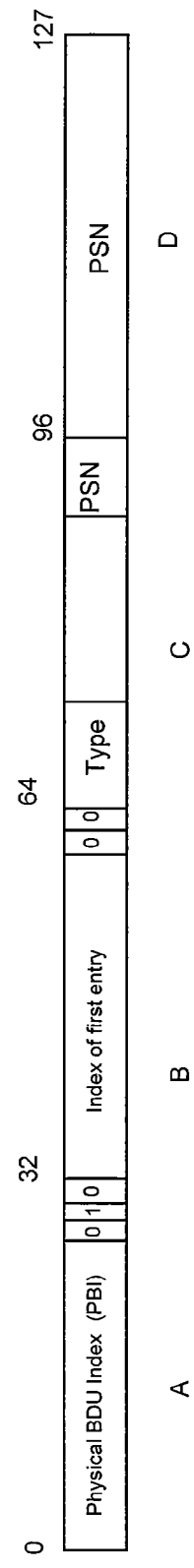
FIG. 20
FIG. 21

FIG. 26

METHOD AND SYSTEM FOR STORAGE OF DATA IN NON-VOLATILE MEDIA

This application claims the benefit of U.S. provisional application Ser. No. 61/003,897, filed on Nov. 21, 2007, which is incorporated herein by reference. The present application is a continuation-in-part of U.S. application Ser. No. 11/405,083, filed on Apr. 17, 2006, which claims priority to U.S. provisional application Ser. No. 60/674,189, filed on Apr. 21, 2005, and to U.S. provisional application Ser. No. 60/698,626, filed on Jul. 11, 2005, and is a continuation-in-part of U.S. application Ser. No. 12/079,364, filed on Mar. 26, 2008, which claims priority to U.S. provisional application Ser. No. 60/920,737, which was filed on Mar. 29, 2007, each of which is incorporated herein by reference.

TECHNICAL FIELD

This application may relate to the storage of data on volatile and non-volatile storage media.

BACKGROUND

Non-volatile memory or non-volatile storage (NVS) is useful in computing systems to store data which needs to be retained for a long period of time, and retain data integrity after a power loss or other system failure event. Examples of non-volatile storage may be magnetic disks, magnetic tape, optical disks, and flash memory. Such memory is also called persistent storage.

Flash memory is an example of NVS that stores information in an array of semiconductor memory cells. In a single-level cell (SLC) device, each cell stores only one bit of information. A recently developed type of flash memory, known as a multi-level cell (MLC) device, can store more than one bit per cell by choosing between multiple levels of electrical charge to apply to the cell. Other types of NVS are being developed, and may be expected to come into use in the future.

Two generic types of flash memory circuits are currently in wide use: NOR and NAND. At present, for large memory systems, NAND flash memory is preferred. While NOR flash memory permits reading and writing (programming) operations to be performed on a byte basis, and erasing on a region known as a "block", NAND flash is organized on a block basis, analogous to a magnetic disk drive. As such, the terms sector, page, and block may be used by analogy on a hierarchical basis. The size of each of these data storage regions may vary depending on the actual product being discussed; however, the term block, when used in relation to the physical memory denotes the smallest contiguous range of physical memory locations that can be erased. Erasing a block sets all of the bits in the block to "1". Writing, sometimes called programming, sets selected bits of a sector or a page of the block to "0" so as to result in the writing of information (data) to the memory. Sector or page programming operations within a block are performed sequentially. Such programming operations can be performed only once for each sector of NAND memory, and an entire block of the memory containing the sector must be erased prior to again writing the sector.

Since, modifying the data stored in NVS for a logical memory address would require another write to the physical memory location, which cannot be performed immediately in flash systems, the usual approach taken is to relocate the logical memory location in the physical memory so as to write the modified data to an unused, but previously-erased sector. The sector from which the data has been relocated now contains out-of-date data, and is no longer of interest to the user. As such it may be considered a "dead or invalid" sector, while the data which is current is considered to be stored in "live or valid" sectors. Sectors that are available for the writing of data may be called "free" sectors. The same terminology may be applied to describing pages, blocks, or the like.

Metadata may include data about the data stored in the system. The metadata may be, for example, the association of a logical data element to a physical storage location. It may further include information on the type of data, the time of writing of the data, error correcting codes, and other information, depending on the requirements of a file management system, thin provisioning system, distributed RAID management, disk emulation or other user needs.

When an interruption in system operation occurs due to, for example, a power failure, a hardware failure, or a software-related error, the metadata stored in volatile memory may be corrupted or lost, and the location of user data and other information, including housekeeping or status information, in the non-volatile storage (NVS) may no longer be known as of the time of the interruption.

SUMMARY

A memory system and method for storing data in a non-volatile memory of the system is disclosed.

In an aspect, the method including maintaining a checkpointed copy of a dynamic table in non-volatile storage (NVS), and maintaining a transaction log for the dynamic table in NVS. When the dynamic table is not current or needs to be restored, the method includes discovering changes to the dynamic table that are not contained in the transaction log and updating the dynamic table by applying the transactions in the transaction log and the discovered changes. It may also include discovering entries in the transaction log which did not actually occur, such as a situation where the transaction log is written to NVS before one or more of the transactions being logged has started and/or finished being written to NVS.

In another aspect, the system for storage of data may include a processor, a volatile memory device (VS); and a non-volatile memory device (NVS). The processor may be configured to maintain a dynamic table in the VS of metadata representing data stored in the NVS; an incrementally checkpointed version of the dynamic table in NVS; and, a log in VS representing transactions affecting the metadata the log being incrementally checkpointed to NVS. The metadata may be repaired by discovering data written to the NVS between the last incremental checkpoint of the log in the NVS and the time of recovery or repair.

In yet another aspect, a computer program product is disclosed, the product being storable on a computer readable medium and having instructions for configuring a processor and memory system to maintain metadata representing data stored in a non-volatile storage device (NVS). A checkpointed version of the metadata on NVS and a transaction log may be maintained in NVS, and the metadata may be repaired by: applying the transactions of the transaction log to the checkpointed metadata to update the metadata; discovering data written during a time when the transaction log had not as yet been updated to include a transaction; and, applying the transactions in the ordered recovery log to the updated metadata.

BRIEF DESCRIPTION OF THE DRAWINGS

FIG. 6 (A) is an example of the data structure of an index word of the metadata; and (B) is a portion of the index word for another arrangement of modules;

FIG. 12 shows the data structure of the RBR spare area;

FIG. 13 shows the data structure of the Index Block (IB) spare area;

FIG. 16 shows the data structure of the MTE location field of FIG. 15;

FIG. 20 shows the data structure of a log entry for a Map Table Entry (MTE);

FIG. 21 shows the data structure of the log entry for a checkpoint block write operation;

Figure 26:
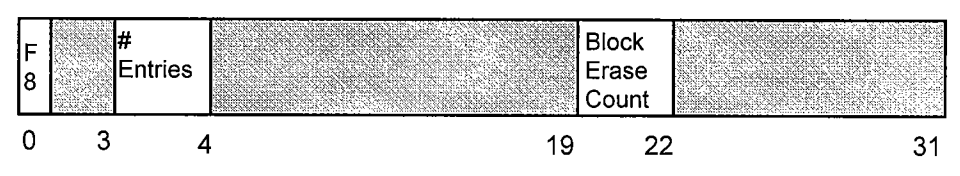

FIG. 26 shows the data structure for the log block spare area.

DETAILED DESCRIPTION

Figure 1:
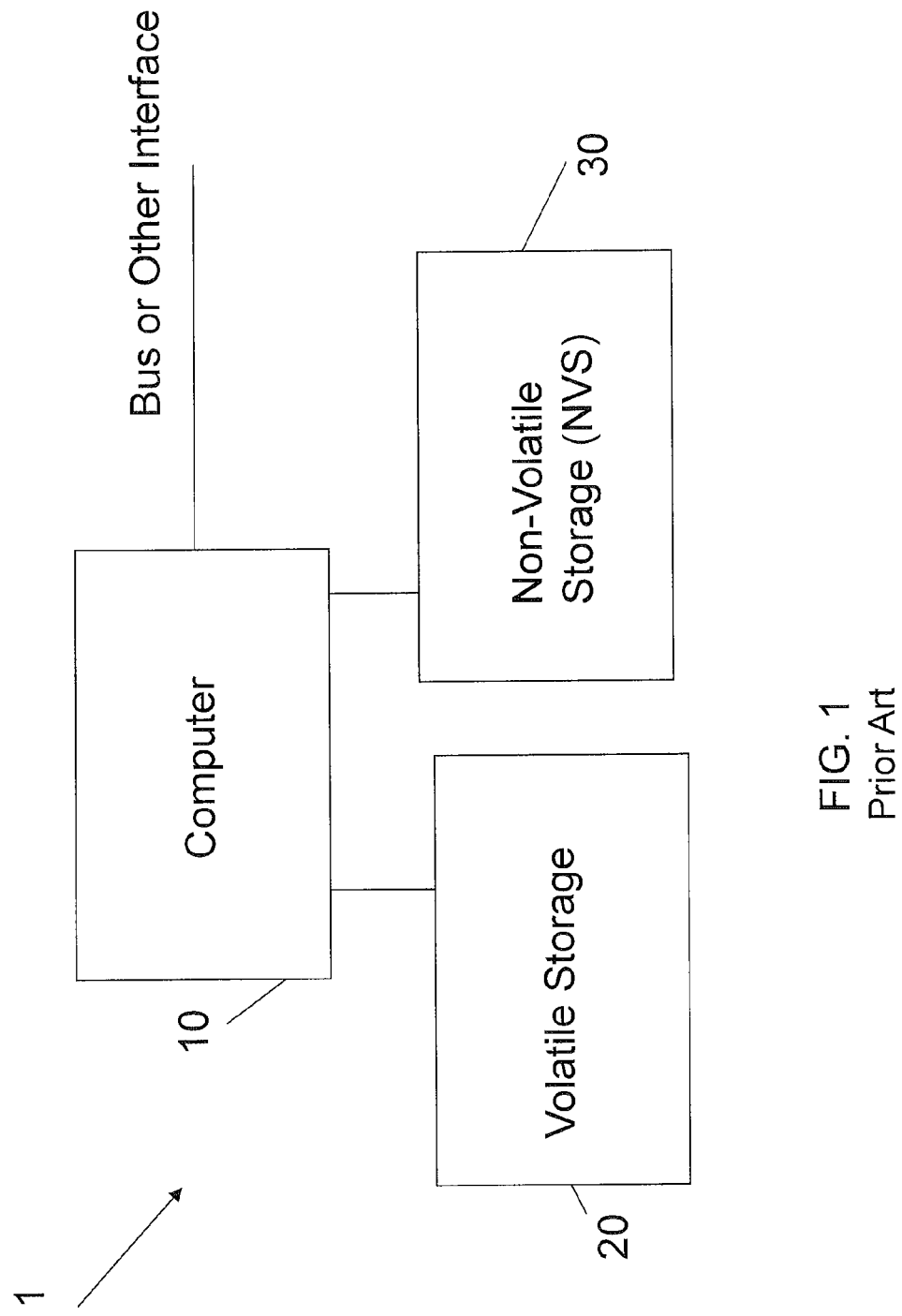
FIG. 1 illustrates a data storage system having volatile and non-volatile storage circuits.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

Reference may be made in this application to systems, apparatus, components, or techniques that are known, so as to enable a person of ordinary skill in the art to be able to comprehend the examples disclosed in the specification. The examples are intended to enable a person of ordinary skill in the art to practice the inventive concepts as claimed herein, using systems, apparatus, components, or techniques that may be known, disclosed herein, or hereafter developed, or combinations thereof. Where a comparison of performance is made between the examples disclosed herein and any known system, apparatus, component, or technique, such comparison is made solely to permit a person of skill in the art to more conveniently understand the present novel system, apparatus, component, or technique, and it should be understood that, in complex systems, various configurations and conditions may exist where the comparisons made may be better, worse, or substantially the same, without implying that such results are invariably obtained or constitute a limitation on the performance which may be obtained.

It will be appreciated that the methods described and the apparatus shown in the figures may be configured or embodied in machine-executable instructions, e.g., software, or in hardware, or in a combination of both. The instructions can be used to cause a general-purpose computer, a microprocessor, a special-purpose processor, such as a memory controller, DSP or array processor, or the like, that is programmed with the instructions to perform the operations described. Alternatively, the operations might be performed by specific hardware components that contain hardwired logic or firmware instructions for performing the operations described, or by any combination of programmed computer components and custom hardware components, which may include analog circuits. Such hardware components may include field programmable gate arrays (FPGA), application specific integrated circuits (ASIC), mixed logic and analog circuits, and the like.

The methods may be provided, at least in part, as a computer program product that may include instructions which may be stored or distributed on a machine-readable medium and which may be used to cause a computer (or other electronic devices) to perform the function or method. For the purposes of this specification, the terms "machine-readable medium" shall be taken to include any medium that is capable of storing a sequence of instructions or data for reading by, or for execution by, a computing machine or special-purpose hardware and that cause the machine or special purpose hardware to perform any one of the methodologies or functions described herein. The term "machine-readable medium" shall accordingly be taken include, but not be limited to, solid-state memories, optical and magnetic disks, magnetic memories, and optical memories.

For example, but not by way of limitation, a machine readable medium may include read-only memory (ROM); dynamic random access memory (RAM) of all types (e.g., S-RAM, D-RAM, P-RAM, M-RAM); programmable read only memory (PROM); electronically alterable read only memory (EPROM); magnetic random access memory; magnetic disk storage media; and, flash memory of all types (e.g., SLC, MLC, phase change), other non-volatile memory types that are known or may be subsequently be developed, or the like.

Furthermore, it is common in the art to speak of software, in one form or another (e.g., program, procedure, process, application, module, algorithm or logic), as taking an action or causing a result. Such expressions are merely a convenient way of saying that execution of the software by a computer or equivalent device causes the processor of the computer or the equivalent device to perform an action or a produce a result, a representation of which may be stored, for example, in a memory location, or be used to act on an external device or system, either locally or over a network.

When describing a particular example, the example may include a particular feature, structure, or characteristic, but every example may not necessarily include the particular feature, structure or characteristic. This should not be taken as a suggestion or implication that the features, structures or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly set forth herein.

Metadata may include data about the data stored in the system. The metadata may be, for example, the association of a logical data element to a physical storage location, and the association of a physical storage location with a logical data element. It may further include information on the type of data, the time of writing of the data, error correcting codes, and other information, including information on the state of the physical storage location, and the like, depending on the requirements of the particular system. Changes to the metadata are made to the metadata itself, and may be also made to a log so as to keep the metadata coherent with the stored data that the metadata is intended to represent.

Metadata may relate to data stored in a die, a chip, a module, a volume or a system, and may refer to, or be referred to by other metadata. For simplicity, the metadata associated with the storage of data on a die is discussed, and then aspects of the metadata stored on a chip, module or system are introduced to the extent needed. The metadata may be organized as a table indexed on the "logical block address" (LBA), but may also be stored with respect to the physical memory locations (e.g., PBA as well. Often an address index is associated with individual sectors or pages on a disk, or sectors or pages of a block on a flash die, and may be 512 bytes. In other aspects, the address index may be associated with a page having a plurality of sectors (typically 4). In this context, the term LBA may refer to the smallest increment of data addresses being represented by the metadata; for example 512 bytes, or 2K bytes. Where the stored data has attributes that are stored in the memory, such as in a spare area of a flash chip, the presence of such data may be included as one of the attributes of the LBA and be considered as local metadata.

Included in the metadata for an LBA may be the physical address of the location in which the data for the LBA is stored, and an LBA sequence number. The LBA sequence number may be particular to each LBA and may be initialized at the reset of the associated memory device, or the sequence number may be set to a value by a command. Each time the data of the LBA is altered, the value of the sequence number (SeqLba) of the LBA may be incremented by unity. If the sequence number is associated with more than one LBA, the sequence number may be set to the current value of a counter rather than incremented. Alternatively, the sequence number may be a time stamp or portion of a clock value, a random number, or another otherwise arbitrarily assigned value Where the term LBA, or the like, is used to refer to data received from a process initiated a host or user computer, the user may consider that the LBA may refer to either a logical or physical address in the memory. The memory system may accept this designation, and form a mapping between the user representation of the data location and the actual data location in the memory by considering that any user data location is a logical location in the memory. Thus, the file management system of a user may be substantially decoupled from the operation of the memory system, and a plurality of file management system types, which may be legacy software, may operate successfully on the host computer.

For simplicity of description, the memory locations of the memory system herein may, from the user standpoint, be described as a contiguous span of memory addresses, similar to that used to manage RAM-based memory, and the memory address space may be partitioned into sub-areas in the user memory space, or may be configured by the memory system to allocate such areas to different user processes. The user program may treat the LBA address range as being randomly accessible, as in a RAM memory system, as a block orient device, or using any other addressing scheme.

Where a concept equivalent to RAID (Reliable Array of Inexpensive Disks) is used, a same sequence number may be assigned to corresponding data elements in each memory circuit of the stripe where the RAID group data are stored. Assigning the same sequence number value to each portion of the RAID stripe permits verification that the data read from each portion of the stripe is the most recent data that was written to that portion of the stripe, and that some portion of the stripe did not return data with the correct address but representing an older version of the data. The sequence number need not be sequential but only needs have a property of being able used to verify that all portions of the RAID stripe belong together. Examples of such non-sequential "sequence" numbers could be a shared random number, the T1 Data Integrity Field (DIF), or a checksum of another portion of the stripe: e.g., chunk B's SeqNum is a CRC of chunk A, chunk C's is a CRC of chunk B . . . E's is of D and A's is of E. The SeqNum's of the stripe portions could be pieces of a CRC or ECC computed over all or a portion of the stripe, or the like.

Changes to the metadata may be recorded in a log and written sequentially to the head of the log, which is a chronologically-advancing record of the transactions associated with maintenance of the metadata. The storage space allocated to the log is finite, and thus free space may be reclaimed from, for example, the tail of the log to prevent the log file system from becoming full when the head of the log wraps around when the log file is maintained in a circular buffer. However, the log data may be maintained as a linked list or other data structure. The log file itself may also be considered as metadata.

The metadata for a chip or a module may be written to a chip or chips on the module, so as to maintain the module as an autonomous entity. The failure of a chip may cause the loss of data unless there is a mechanism for the recovery thereof. User data may be stored in a memory system by striping the data across a plurality of modules in a RAID arrangement, and the data stored on a failed module may be reconstructed into a spare module using the RAID.

Where the metadata is stored on a module and a chip or memory area of the module, containing the stored metadata, fails, then the stored metadata may be lost unless an error recovery mechanism is provided. The metadata for chips of a module may be protected against loss by storing the metadata in RAID stripes across a plurality of chips of the module. Since the redundant parity data would only be expected to be used when an unrecoverable error occurred in a metadata block (including the log) stored in the module, the RAID may be of a high order. That is, in a module having 18 chips, the metadata itself may be stored on 17 chips, and the parity data on the 18$^{th}$ chip. The parity data is usually not read unless there is an error needing correction. As such, the storage area needed, and the local processor load, are only slightly increased.

So as to associate the data written to the storage medium with a log entry, a different sequence number (PgmSeqNum, PSN) may be associated with each transaction affecting the data or metadata, or block status on the NVS. The value of PgmSeqNum may be initialized at a time where the medium is initialized or reset, and may be incremented by unity for each LBA data or other data written to the NVS, a block is erased, or other recordable action occurs with respect to the NVS. The value of the PgmSeqNum may be stored along with other data characterizing the LBA data in, for example, spare areas of NVS associated with each sector or page. A spare area of NVS may be any address range that is allocated to be used for the storage of metadata or other information that is not the data itself that is being stored. The spare area may be contiguous to a sector, or a page, or may be one or more non-contiguous address ranges. When associated with a sector or page, the spare area is sometimes called auxiliary data. Typically, we will use the terms interchangeably herein.

The log file may contain an entry for each operation on the storage medium that changes the data stored thereon or the location of the data stored, and may include, the LBA, the previous physical memory location, the new physical memory location, SeqLba, PgmSeqNum, and any other information which may have been needed in order to update the metadata for the LBA. The metadata and the log may also contain information representing the status of a block, including the pages and sectors thereof. Such information may be, for example, that the block, pages or sectors are one of free, live, dead, or bad.

The log file may exist in NVS; however, a segment of the log file representing the most recent transactions may be stored in volatile memory (such as DRAM) at the moment that a "crash" occurs. The segment of the log file in volatile memory may not as yet have been written to the NVS before the metadata becomes lost or corrupted by the crash. Where the transaction data is said to have been entered in the log file, the segments of transaction data already stored in the NVS is meant, unless specifically mentioned to the contrary. This discussion presumes that there may be insufficient remaining power remaining a time of a power failure, or other circumstance, where the current metadata and the transaction log have not been completely stored from the volatile memory to the NVS. Where all of the metadata and the transaction log can be stored in NVS prior to cessation of operation, this may be termed a "clean" shutdown, and the metadata, at least as updated by any transactions in the stored log, is a current representation of the data stored in the flash memory. In the case of a crash associated with a programming fault or similar event, there may be no opportunity to perform the data transfer, or the data transfer may be incomplete or corrupted.

The metadata, the log file, and similar information may be stored in NVS in, for example, circular buffers. In an aspect, the metadata and log data may be stored in data structures which are allocated dynamically and freed when no longer needed, forming a chain rather than a circle. Segments of the metadata, representing ranges of LBAs (which may not be either complete or contiguous) may be periodically added (checkpointed) to the stored data in NVS by being placed at the head of a NVS metadata buffer so that, eventually, all of the LBA metadata has been stored in the NVS, although the stored metadata may represent a "snapshot" of each of the LBA address ranges at a time in the past. The NVS memory allocated for checkpointing is sufficiently large so that at least an entire current set of the metadata and any associated transaction log for the relevant storage medium may be stored therein. Eventually, the buffer may logically wrap around and old data may be overwritten. Generally, only the most recent metadata set is used to recover from a crash; however, older metadata may be retained for diagnostic purposes, where the storage area allocated for the metadata storage exceeds that for a complete checkpoint.

The size of the transaction log file in NVS needs to be at least sufficient to record the changes made to the metadata subsequent to the storage of updated metadata for each LBA address range (the last incremental checkpoint), so that a complete set of metadata for the stored data is stored in NVS, or is recoverable from the NVS. The periodicity of metadata updates and the length of the log file in NVS are design trade-offs, and may be adjustable dynamically depending on the mix of read and write operations.

To provide context for the examples, an available flash memory device is used to characterize the NVS. The use of a specific memory device is not intended to suggest that other NVS memory devices, which may include non-volatile memory types being developed, or which may be developed, that have similar functional properties, are not equally usable, depending on the specific design considerations for the memory system. A combination of several different NVS memory technologies may be used for the NVS, and a combination of several different memory types may also be used for the volatile storage. Both the volatile memory circuits and the non-volatile memory circuits may include some amount of the other memory type for convenience.

An example NVS device in current production is a 1 GByte flash memory circuit, Samsung part number K9W8G08U1M, having two 512 MByte dies in the same physical package. The device has a shared 8-bit I/O bus, and a number of shared control signals. The two dies have separate enable and ready/busy signals. For simplicity, when a flash memory device is referred to in the examples, only one of the dies is meant, except when operation of the two dies in a module or chip is discussed. However, the extension to chips of larger or smaller capacities and to multiple chip packages would be understood by a person of skill in the art. It will be understood that the specific design of the flash memory chip used in the example is so as to facilitate understanding of the example, and that differing specification devices, which may have different bus structures, data capacities, and the like, may be equally usable. The choice of memory circuit may change as the NVS memory industry evolves.

Each die contains 4096 blocks; each block contains sixty four (64) 2 KByte pages. That is, each die has a capacity of 512 Mbytes (MB) and a package of two dies (which may be a chip) has a capacity of 1 GByte (GB). Each page may also be comprised of four (4) 512 byte sectors. Each page may include a 64 byte region used to hold local metadata, which may be termed auxiliary data for the sector. The data and local metadata of a page may also be differently arranged, with metadata for the entire page contained in one 64 byte region or allocated to the sectors of the page. In an example, data may be read by transferring an image of an entire page from the flash storage into a 2 KByte+64 byte volatile data register. The data thus read may be accessed from the volatile data register as byte data, or the entire page shifted out over a data bus. A subset of the page may also be shifted out, since the read pointer can be started at any byte in the page. Where reading of a page or a sector is described, the local metadata may be presumed to have also been read should the metadata have been needed. When needed, the metadata may then be accessed without transferring the remaining data of the sector or page.

Reading a page from the non-volatile memory circuits into the data register may take about 25 microseconds, and the data may be shifted out to the chip data bus at a rate of 20 MBytes/second. Shifting an entire page to or from the register and the bus requires about 100 microseconds. Where only the auxiliary data is needed, the read time may be reduced to the approximately the 25 microseconds needed to read the data for a page into the data register.

Before a block can be used to store data, the must be erased, a process which may take about 2 milliseconds. Erasing sets all bits in the block to "1", and subsequent write (programming) operations selectively clear bits to "0". Once a bit is "0", it can only be set to "1" by erasing the entire block. That is, once one or more sectors of a block have been written to, the same sectors cannot be written to again until the entire block has been erased. Blocks that are only partially filled may continue to have data written thereto, to the free sectors or pages in ascending order.

Writing may be carried out by shifting data into the chip data register and then executing a command that writes the data into the non-volatile memory (NVS) circuit; writes take about 200 microseconds, exclusive of the time need to move the data from the bus into the data register. The data and metadata area of a page can each be written up to four times between erasures, where the page is considered as comprised of four (4) sectors. That is, each of the sectors of the page may be separately written in increasing sequence order. This aspect may permit the page to be treated as four 512 byte sectors, and each sector may have an associated ECC, or other local metadata. The pages in a flash memory block are written sequentially, from low page addresses to high page addresses. A memory address of stored data may be considered to be represented by, for example, the block number, the sequential page number in the block, and the sector number, and may include the location of a byte within a sector, if needed. Once a page has been written, earlier pages in the block can no longer be written until after the next erasure of the entire block.

Often, in the examples herein, a page is used to describe the smallest contiguous group of memory locations being read, written, or the like. This is for simplicity in discussion. As has been previously described, many NVS circuits are writable at the sector level, where there may be a plurality of sectors (typically 4) in a page. As has been previously described, the sectors of a page may be written in sequence so that a page may be written as four sectors, in increasing order, but not necessarily together. When data is read from a page, the data is transferred to a volatile data register, and only a portion of the data further transferred or operated upon. For example, only a sector of a page, only a byte of data, or only the spare area of the sector or page may be actually placed on the bus of the chip.

The use of the terms sector, page, and block in the previous discussion reflects the commonly accepted terminology for flash memory circuits, and resulted from the adoption of several terms from the rotating disk memory technology. However, where data structures are described herein, the term "block" may have a different meaning, which is made clear in the subsequent discussion. A block of data in a data structure has a size and characteristics defined by the logical data structure definition, and may not correspond to a block of flash memory representing the minimum amount of memory that can be erased in an erase operation. The term data "segment" may refer to a block of data of a fixed or variable size that may not correspond in size to a flash memory block of physical memory. The terms page and sector may also be replaced by other terminology that is used when referring to data and the location thereof. This should be clear from the context of the examples.

In an example of a system 1, shown in FIG. 1, a computer or bus interface processor 10 communicates with a volatile storage device 20 and a non-volatile storage (NVS) device 30, which may be a flash memory. The volatile storage 20 may be a device such as a dynamic random access memory (DRAM) a static random access memory (SRAM), or the like. Volatile memories, or volatile storage (VS) are known to require essentially continuous application of a source of electrical power in order to maintain the integrity of data stored in such memory. Often this power is supplemented by a battery backup system which may be at any level of the system architecture; however, such a backup power supply does not persist indefinitely and, for purposes of this example, a loss of system prime power or other power interruption is considered to result in a loss or possible corruption of the data in the volatile storage 20. For convenience, the volatile storage (VS) is described herein as RAM. Non-volatile storage (NVS) may be a device having memory circuits or media where the data integrity is maintained even after a loss of power. Such media as magnetic disks, or flash memory of various types, are currently used. For purposes of the examples, a SLC NAND flash memory circuit is used as the NVS building block, without intending to limit the type of NVS that may be used.

The bus interface 10 may communicate with other components of a computing system such as a host processor, which may have associated therewith other storage media, such as RAM, magnetic disks, magnetic tape, and the like, and may also interface with external communications networks. The bus interface 10 may be configured to interface with a bus of a larger NVS memory system, of which the assembly of FIG. 1 may be considered to be a module. Such a memory system is shown in FIG. 2. In an aspect, the assembly of FIG. 1 may be considered as a solid state disk (SSD), and may be used individually or as part of a larger memory system.

The RAM 20 may be used to store data being operated on by computer programs which may also stored in the RAM prior to execution; the RAM may include an area for the volatile storage of data and metadata, the metadata being used to represent aspects of the data, programs, further metadata, log files, and the like, that may be stored on the NVS.

Where the module is part of a larger memory system, other volatile memory areas may also be provided for the temporary storage of program instructions and data for operation on by another computer, processor, or the like. The RAM associated with a memory module may be used as an intermediary storage between the NVS devices and any other storage medium.

To reiterate, the term module is a convenience for visualizing a group of NVS memory circuits, which may be associated with a computing system. The module may also include a bus interface for communicating with other portions of a system. A module need not have all components physically resident on a single circuit board, substrate, or package. Alternatively, more than one module may be resident on a single board, substrate or package.

The metadata being manipulated may stored in RAM as well as in the NVS as, at the present time, the access time for reading and writing data in NVS is longer than for data in RAM, and the NVS may also have limitations such as the number of writes or erases before wear out. One may consider the metadata in the RAM (VS) to be the volatile metadata, and the metadata in the NVS (e.g., flash) to desirably be a non-volatile almost current or current image of the volatile metadata. Thus, when metadata is used to manage the storage and retrieval of data on NVS, the speed of operation may be faster when the metadata modified is in RAM. Where the term data is used herein, any of user data, metadata, file data, program instructions, log files and the like, is meant, except when specifically excluded.

The metadata in the volatile storage (VS) may be lost, corrupted, or otherwise rendered unusable by a loss of system power, or other unexpected events. This is often called a "crash". Herein, the term "crash" is used to represent any event that causes the metadata in VS to be rendered unusable for its intended purpose. The cause of a crash may be a power failure, a hardware defect, a software programming error, or similar occurrence. This occurrence may also known as a "dirty" shutdown, so as to differentiate the situation where the system is shut down in an orderly manner (a "clean" shutdown"), and where all of the data and metadata is correctly stored (checkpointed) in NVS, and the stored metadata, or a combination of the stored metadata and a stored transaction log represents the current state of the stored data.

In this example, volatile metadata is stored in RAM, the metadata describing the location and attributes of each logical element of data stored in the NVS. The logical data element storage description may have the granularity of, for example, a sector, a page, a block, or a volume. In this example, the logical element is a sector. When the system 1 begins operation, data received by the system 1, or produced by operation of the system and its associated software programs, may be stored or retrieved from the NVS. When data is written into the NVS, the data is organized as sectors, each having a logical block address (LBA). The metadata associates the logical block address (LBA) with the physical memory location of the sector in the NVS, and may also contain other information regarding the data, such as a time stamp, sequence numbers (e.g., SeqLba, PgmSeqNum), data type, checksum or other error correcting codes (ECC), and the like. The time stamp may relate to a system timer so that the relative order of operations may be organized with respect to the arrow of time to a predetermined granularity.

A snapshot (checkpoint) of the volatile metadata may be taken, stored in NVS and used as a first baseline. Each time that the file management system causes data to be written to the NVS, the association between the logical element and the physical location thereof is updated and stored in the volatile metadata, along with any changed attributes of the data or storage location, and the transaction is also stored in the log in volatile storage.

Periodically, or after a predetermined number of updates to the volatile metadata, segments of the metadata (for example, pages) are written into NVS so that, after a period of time or number of operations, the metadata stored in NVS constitutes a new baseline, as all of the metadata pages have been written to NVS. The metadata may be stored in a circular buffer having a depth greater than the number of metadata pages so that a complete metadata set, albeit perhaps having different validity times, is in NVS. However, as soon as an operation is performed which modifies the metadata page in volatile memory such that it differs from its checkpointed image in NVS, the stored data is out-of-date, and does not represent the current status of the entire memory system. A log of the transactions resulting in changes to the metadata is maintained in volatile storage, and segments of the log data are incrementally written from the volatile memory into NVS, typically after a predetermined elapsed time or number of metadata changes. This would enable the stored log to be used to update the stored metadata to a time where the last segment of the log had been stored in NVS.

The current volatile metadata or the volatile log data may not have been written (checkpointed) into NVS immediately, and the occurrence of a crash may render the metadata and log data in RAM unusable; and, the metadata image in the NVS, and the log in the NVS, may not be completely current. Data may have subsequently been written to the NVS, garbage collection or wear leveling housekeeping operations may have resulted in relocation of data, or the like, and the record of the location of some the data may now be lost. As well, data may have been transferred from one physical location in the NVS to another for other reasons and the action not as yet persistently recorded. These "lost" data need to be located, or "discovered", and the metadata updated so that the system may resume operation on a metadata set that has coherence with the data set as existed in reality at the moment of the crash.

The metadata may include other information such as a table of bad blocks, usage data, such as the number of previous erase operations performed, for each flash block, the occupancy of each flash memory block, and the like. As sectors of a memory block are written, the physical page address (index) of the block to be written to is incremented, and each block 'i' may characterized by an occupancy, which may be represented by a value MaxNum[i], which is the index number of the highest address sector in the block to which data has been written. Sectors having higher page numbers are expected to be all "1", as they have been previously erased as a result of a block erase operation, and have not as yet again been written to, or "programmed." MaxNum=0 may be used to indicate that the block has been previously erased, and that data has not as yet been written to the block. A MaxNum[i] =MAX_BLOCK, where the value MAX_BLOCK is the number of sectors in the block, would indicate, for example, that the block has been filled. (In this example, the block comprises 64 pages having 4 sectors per page, so that MAX-BLOCK=255)

The process of recovery from a crash may include scanning the checkpointed metadata stored in NVS so as to determine the most current version of each metadata segment. Where more than one image of a metadata segment (for example, a logical address range) of the metadata is found, then the older of the two segments is ignored. The oldest time of each retained most-current metadata segment sets a time boundary for the consideration of changes to be made on the basis of the transaction log retrieved from the NVS. Data in the transaction log that has been stored in NVS, and which is older than the oldest time for a retained segment represents changes that were already recorded in the stored metadata. So, the update may start where the transaction log time equals the oldest most recent checkpoint time for each type of metadata.

In an aspect, situations may arise where a block has been erased, and the occurrence thereof has not as yet been recorded in the transaction log in NVS. Should the block be needed for a write operation, the erase operation may have been written to the transaction log in VS prior to marking the block as having been erased in the metadata and writing new data into the block.

Consider the metadata for a chip in this example. One of the attributes of such metadata data is that the metadata may describe the data written to the flash memory device, as well as characteristics of the flash device itself. In particular, since the data in a block of a flash device is written sequentially, the information representing the highest page and sector number MAX for each block "i", MaxNum [i]=MAX, that has valid data may be stored as part of the metadata. Since the flash block was erased at some time prior to the time when writing first began to the block, one expects that the sectors and pages higher than the value of MaxNum [i]=MAX will be all "1"s.

As part of the recovery from a crash, the last valid stored metadata set is read from the NVS to the VS. The transaction log data stored in NVS is also read from the NVS into VS, at least from the sequence number or time representing the oldest last stored metadata segment of the checkpoint, and the log processed so as to update the metadata to the last time that the log was saved to the NVS. Actions by such as writing data, including null data, and by other NVS management systems, such as garbage collection or wear leveling, taken subsequent to the last saving of the log to NVS, need to be discovered by other means.

The metadata regarding the value of MaxNum[i] for each block "i" may be scanned. Using the value of MaxNum[i], for each block "i", the sector corresponding to MaxNum[i]+1 of the block is read and, if all the bits of the data area are "1", with appropriate metadata (such as checksum, SeqLba), one may thus determine that no additional data has been written to the block since the metadata for the block was stored in NVS as part of the rolling checkpoint or snapshot, or the saving of the volatile transaction log to the log in NVS.

Data stored in sectors less than or equal to the value of MaxNum[i]=MAX may have been logically deleted, or moved to other areas of NVS. If the data has been moved, and the transaction had not been stored in the log in NVS, the data will now be discovered by the process of checking for data written into sectors above the value of MaxNum[i] for each of the blocks in NVS. The data discovered in sectors above the value of MaxNum[i] may have, as part of the associated sector or page metadata, values for a sequence number (PgmSeqNum), and the current LBA sequence number (SeqLba), and the physical previous location of LBA. This data may be written to a recovery log in volatile storage for the purposes of updating the metadata in VS so as to recover the metadata. Alternatively, the reading of the sector may be limited to the auxiliary data, or spare data as, if this data is all "1", then the data area of the sector may also be presumed to be all "1". Reading the spare data only is a faster operation.

Inspection of the sector MaxNum[i]=MAX+1 may be sufficient to determine that no additional data has been written to a block which has not been erased, as the writing of data to sectors of a block proceeds incrementally in a positive direction. Once new data has been discovered in a memory block, additional sectors are read, the sectors having incrementally greater sector numbers, and the appropriate information read from the descriptive data (local metadata) in the spare area so as to produce an entry in a recovery log, until the first sector that has not been written is discovered. At this juncture, all of the sectors that had been written to the block but not as yet been committed to the log in NVS have been discovered, and added to the recovery log in volatile storage.

The sector corresponding to the value of MaxNum[i]=MAX is also inspected. Two typical situations obtain. In the first, the data in sector whose value is MaxNum[i]=MAX is the data that was written to the sector at a time previous to the crash and already represented in the metadata (at least as updated by the log that had been stored in NVS), and this data had not been "lost" and thus need not be recovered. In the second, the block had been erased, but the transaction had not as yet been written to the log. That is, the information in all sectors whose value less than or equal to MaxNum[i]=MAX has been either moved or deleted, and the block has been erased. This action may have been accounted for by writing an erase transaction for the block to the log. If the data had been rewritten to another sector, the data will have been discovered by the process described herein, and the sector location may be associated with the LBA.

However, new data may have been written to the block after the erase operation and exactly MaxNum[i]=MAX sectors of the block written with new data. The status area of the sector MaxNum[i]=MAX should be inspected to determine that, if valid data is present, that the data was written at a time prior to that where the last log segment had been committed to NVS. If later-written data is found, then all of the data at lower sector numbers of the block is also newly-written data which has been found. However, if the data in the sector MaxNum[i]=MAX is older than the time where the log segment had been committed to NVS, then all of the data in the lower sector numbers has already been accounted for either in the stored metadata or the stored log.

In another aspect, the block may have been erased but as yet not written to for MaxNum[i]=MAX times, so the sector that is being checked had been erased. In such a circumstance the first sector of the block should be read to see if anything was written to the block. If the transaction policy is for the log segments is to sometimes be written to NVS before the data itself is written to NVS, then the fact that less pages have been written than the metadata shows have been written does not necessarily mean the block was erased.

It is also possible to prevent certain cases special cases from occurring depending on the policy used to write the log: for example a block may not be permitted to be erased until an entry indicating that the block is scheduled to be erased is written to NVS, or no write operations may be permitted in a newly erased block until the log entry indicating that the block had been erased has been written to NVS. Thus, cases where the block has been erased and written to, but the metadata does not reflect the erase operation, would not occur.

Various special cases may be avoided by constraining other properties of the system. For example, a newly erased block may not be allowed to be written to for a period of time larger than a log entry is permitted to remain in VS without being written to NVS, or may not be not written to until enough writes have occurred that the log entry containing an indication of the block erasure will have been flushed to NVS due to the growth of the log. In the case where data may be written to NVS before the data corresponding to the log entries was written to NVS, a number of methods could be used to prevent having to "undo" log entries whose operation did not actually start and/or complete. One method would be to discard as many log entries from the tail of the log as could have been written in advance of the actual writes occurring. Or, entries could be verified starting from the tail of the log to determine which writes had completed The local metadata for each sector 'j' of block "i" contains a sequence number (PgmSeqNum[i,j]; PSN), so that the sequential order of the writing of each of the sectors may be determined over a plurality of blocks. The discovered data in sectors of each of the blocks of the chip represents data that has been written to the sectors during a time between the last storage of a transaction log segment to NVS and the crash.

The recovery log of discovered sectors in the plurality of blocks represented by the metadata may be ordered or processed, using PgmSeqNum [i,j], for example, from oldest at the tail to newest at the head. Using the LBA in the metadata stored in the sector or page spare data area, the recovery log provides information on the current association of the sector or page memory location with the LBA, and the immediately previous memory location of the LBA. As such, when the recovery log is processed from the tail to the head, the LBA associated with each sector or page is updated by deleting the association of the LBA with a previous lost sector or page, and associating of the LBA with the sector or page in which it was discovered during the recovery operation. This action also identifies "dead" memory locations so that the entire block may eventually be recovered by erasing the block, once all of the pages are either dead or free, or in accordance with some other policy. The recovery log data for block erasures may not include a sequence number, but the information may be used to update the free block table and to set the MaxNum[i] for erased blocks to zero.

After the completion of the updating, each of the LBAs has been associated with the sector, page and block in which the valid data physically resides. The status of the pages in each of the physical memory blocks is also updated so that housekeeping operations such as garbage collection and wear leveling can be performed.

This example has been simplified by, for example, ignoring maintenance or housekeeping operations such as garbage collection, wear leveling, bad-block detection and handling, and the like. Many of these operations are manifest as movement of data to new sectors, erasing of blocks, changing the bad block table, and the like, and are accounted for in the reconstruction of a valid metadata set by the process described.

Figure 2A:
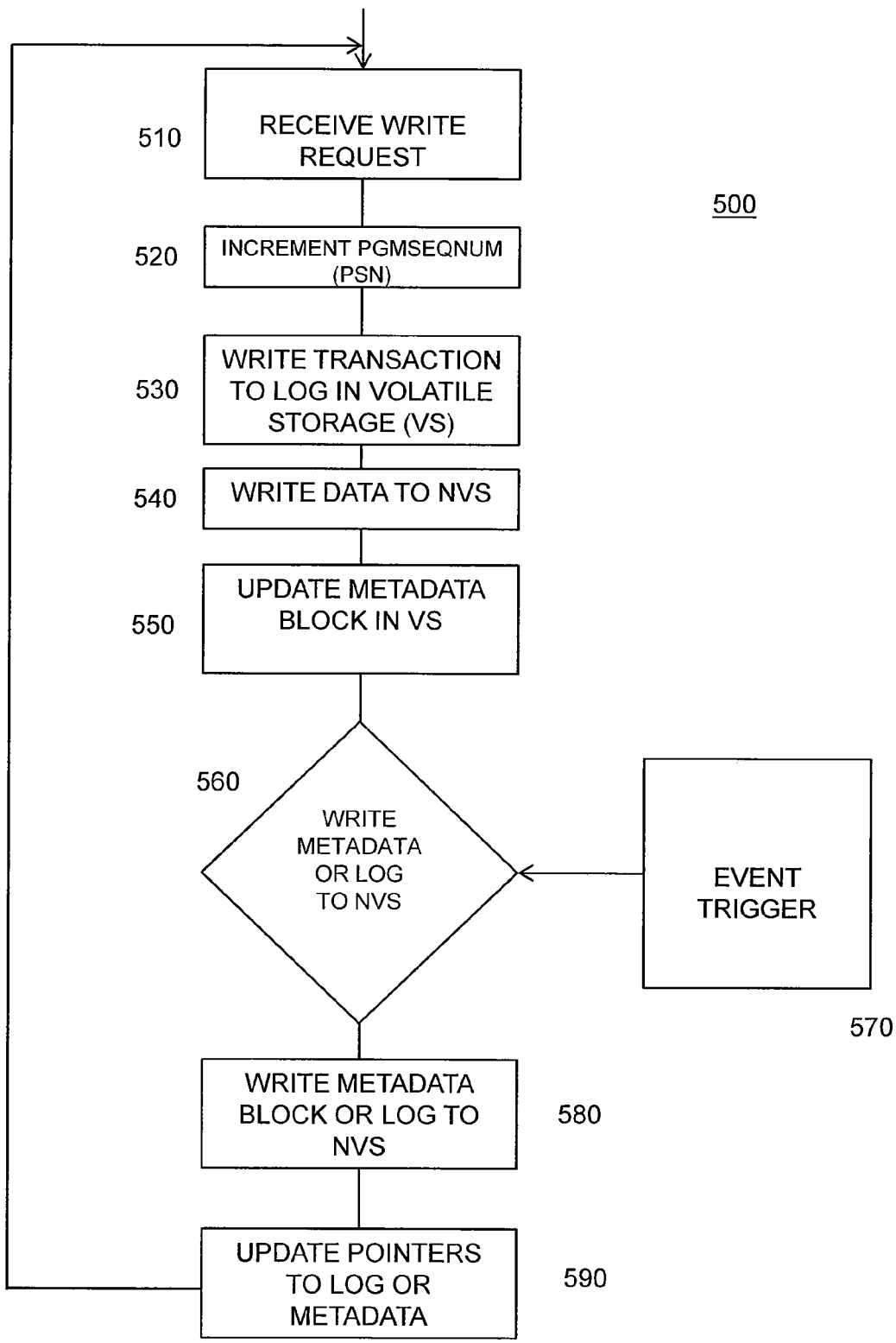
FIG. 2 (A) is a flow chart showing the method a maintaining checkpointed metadata in non-volatile storage (NMS); (B) is a detail of the method showing a method of determining when a segment of the metadata should be checkpointed; and, (C) is a continuation of the method shown in (B)
Figure 2B:
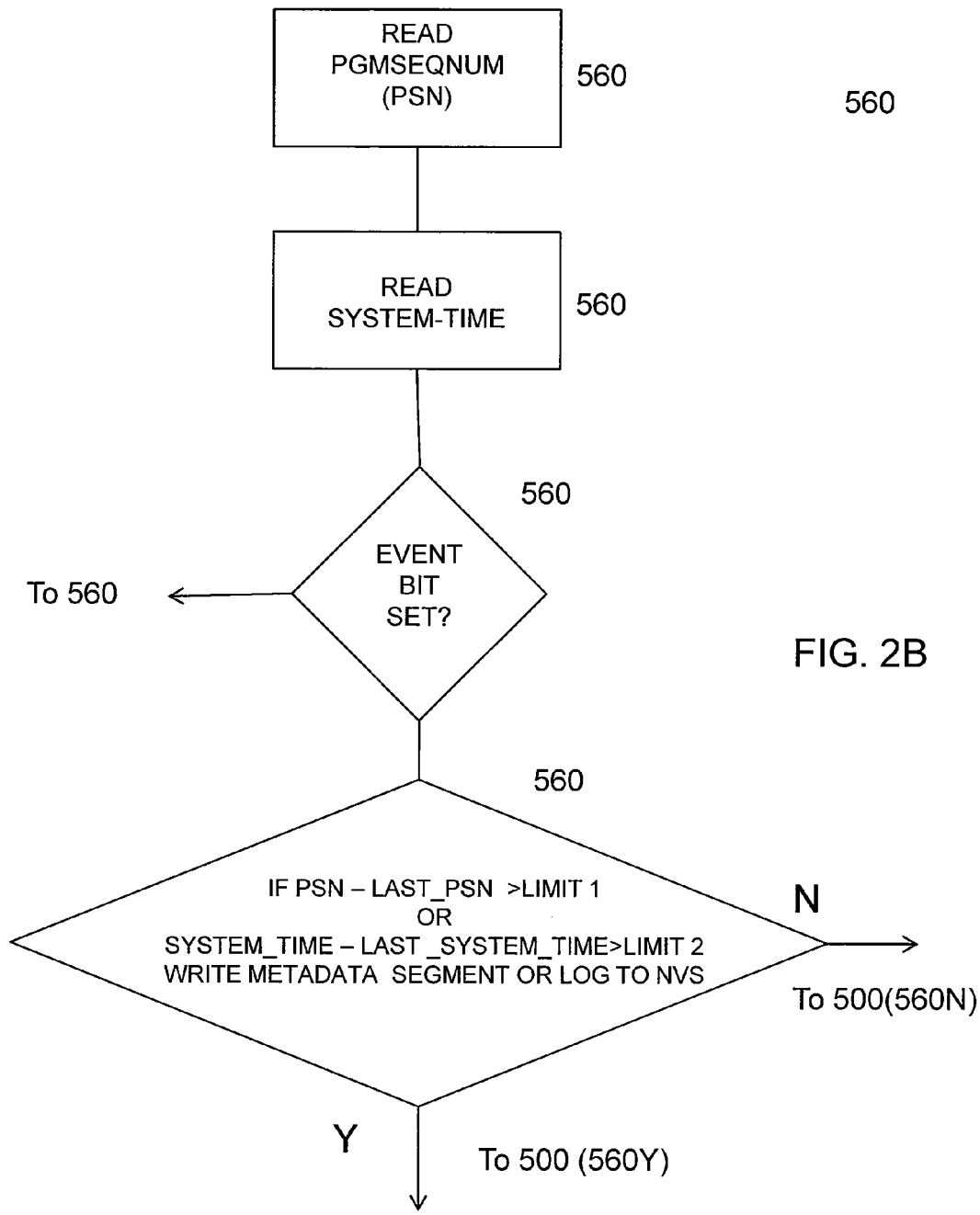
Figure 2C:
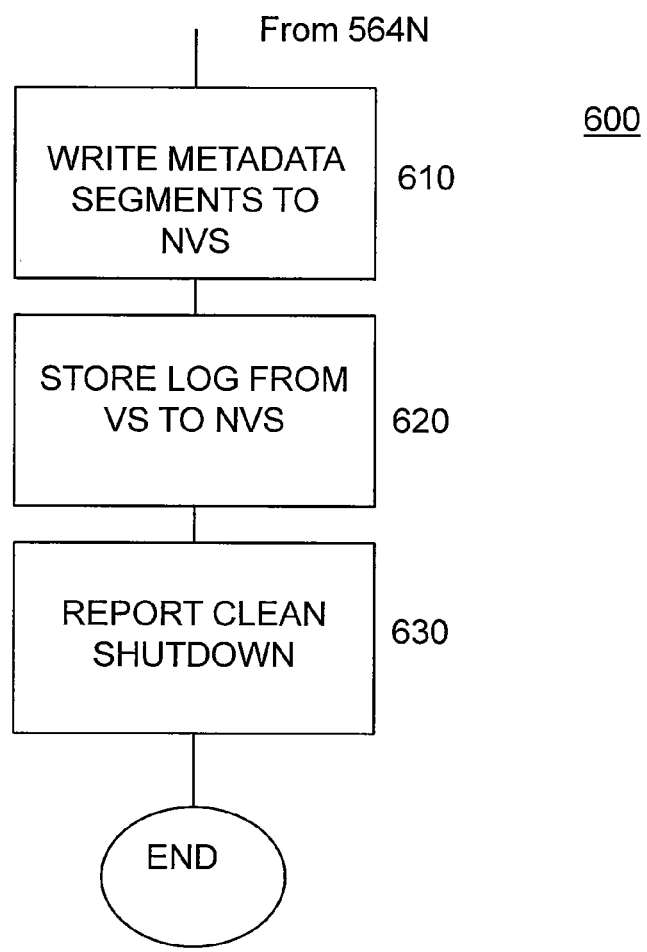
Figure 3:
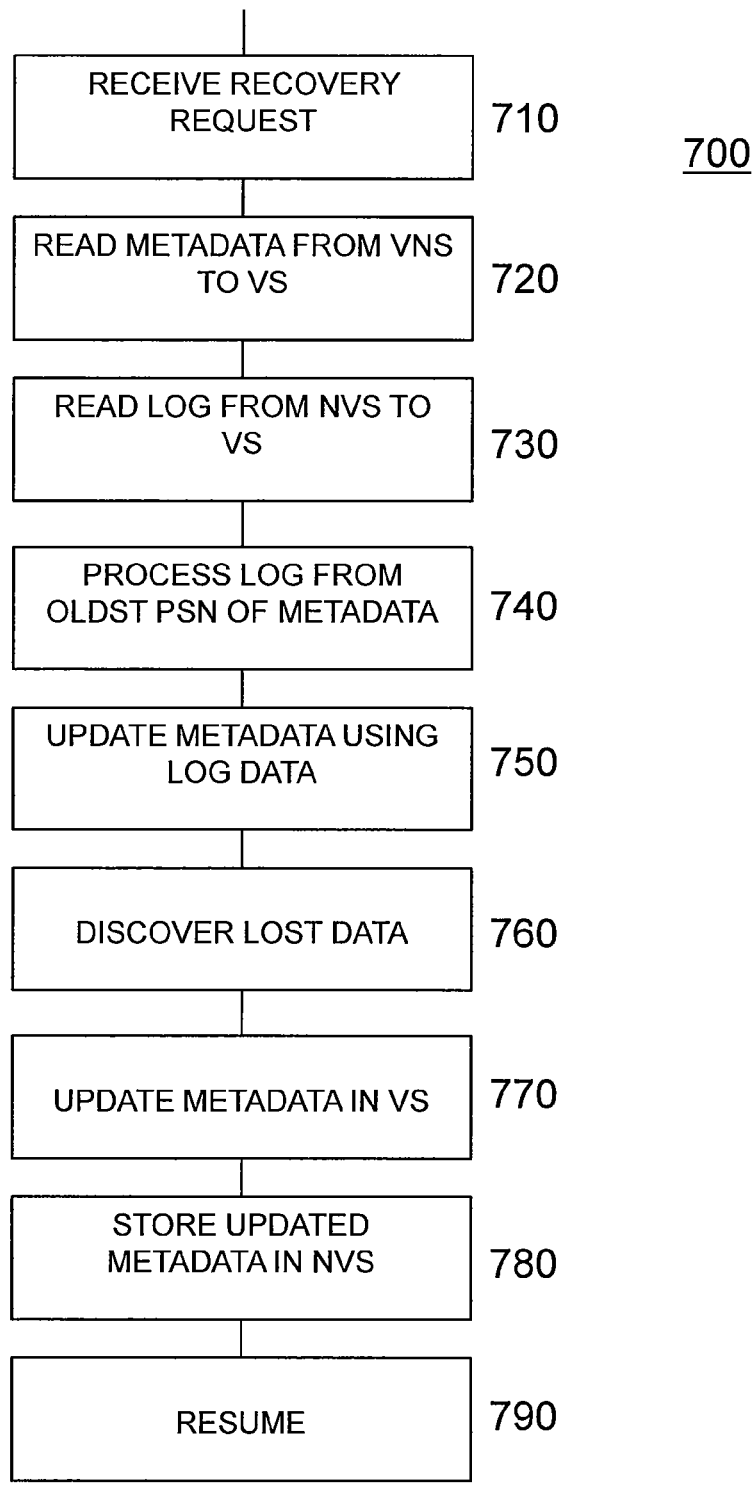
FIG. 3 (A) is a flow chart showing a method of recovering metadata (part I); and (B) is a flow chart showing the method of recovering metadata (part II)
Figure 3:
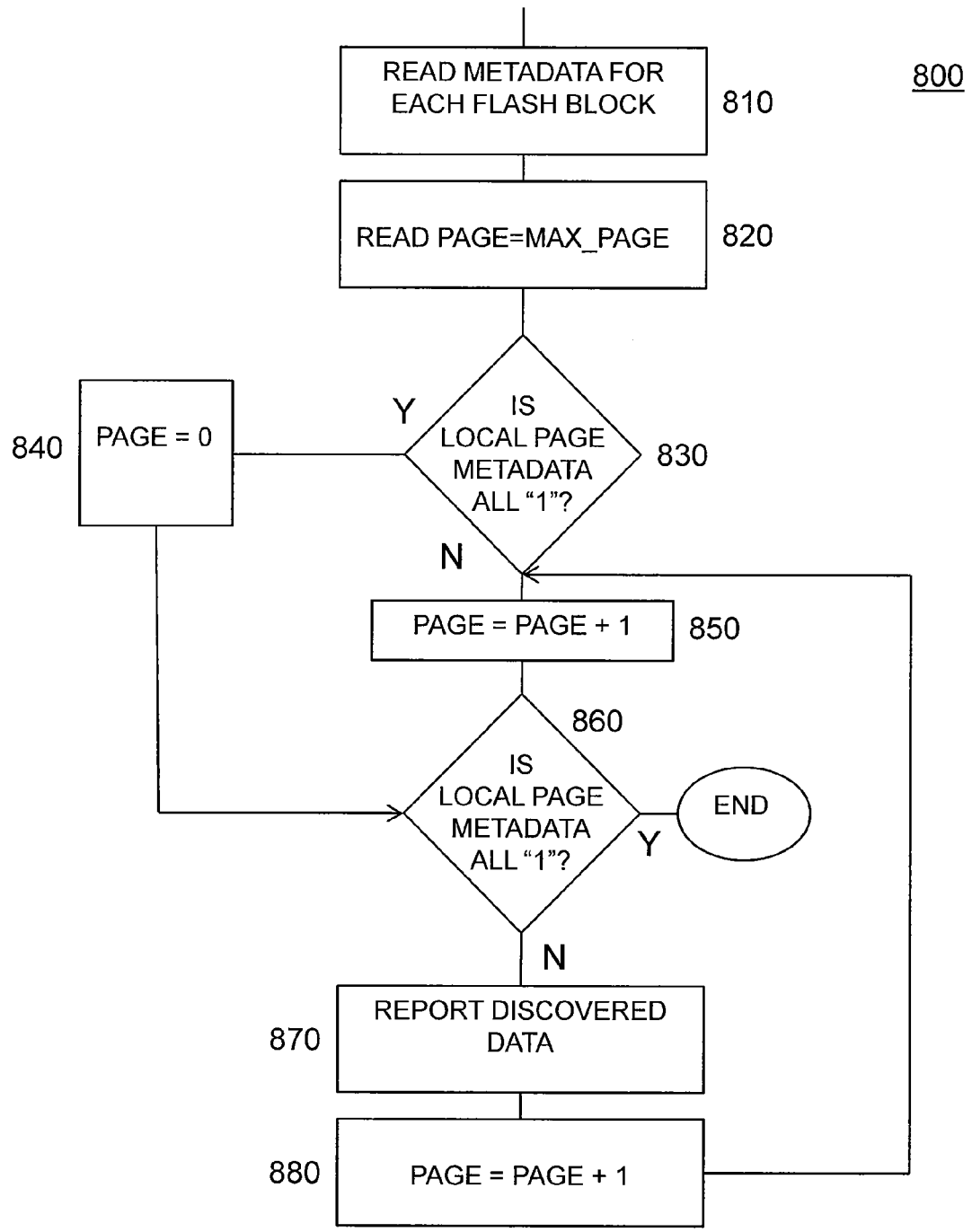

An example of the method of recovering the metadata for the data stored in NVS after shutdown or crash is shown in FIGS. 2 and 3. A method 500 of maintaining the metadata characterizing the status of the flash memory, and the data stored therein is shown in FIG. 2A. A write request (step 510) is received. This request may be for any operation that causes the modification of information or data stored in the NVS. The present PgmSeqNum is incremented by one (step 520) and transaction information related to the write request is entered at the head of the transaction log in VS (step 530). The transaction may be performed by, for example, writing a page of data to a particular page location in a block of flash memory (step 540). The metadata in VS is then updated to reflect the transaction (step 550). This metadata may be comprised, in part, of a plurality of logical data addresses, such that each of the logical data addresses is mapped to a physical memory address of the NVS. For checkpointing purposes, the metadata may be allocated to a plurality of segments, each segment containing a plurality of logical data addresses, for purposes of managing the storage of the metadata in the NVS. When the log or the metadata has been updated, a status is checked to determine whether the metadata segment that has been updated, or a segment of the log, should be written to NVS (step 560). If no information needs to be saved to NVS, then the process returns to step 510 and waits for a new write request.

If information needs to be saved to NVS, then the metadata segment or log is written to NVS (step 580) and pointers to the most recent stored metadata and log are updated. The process returns to step 510. In another aspect, an event, such as a command to perform a clean shutdown may be received (step 570). This may be termed an event trigger and is processed in step 560.

The details of step 560 are shown in FIG. 2B. The present value of PgmSeqNum is read (step 561) as well as the current system time (step 562). The system time may be read from a counter that counts the number of roll-overs of a 1-second counter, or any other time reference that is maintained with respect to the flash memory circuit. The event bit is checked (563) and the process exits to process 600 if the event bit is set. Otherwise, the value of PgmSeqNum and the system time are checked against previously recorded values for the metadata segment or the log (step 564). Here, the difference between the current and a value of the "last" PgmSeqNum or "last" system time is determined. If the value is greater than a limit, which may be a separate parameter for each of the metadata segments and the log, then the process exits to the main process 500 with a Yes result so that the metadata segment, or the log, as appropriate, is written to NVS. The "last" value of the PgmSeqNum and system time, represents the last time that the particular metadata segment or the log has been written (checkpointed) to NVS. The log is saved from the "last" PgmSeqNum to the present. The "last" PgmSeqNum and the "last" time are then updated to the current values. If the result of step 564 is No, then the process exits to the main process with a No result.

In the circumstance that the process 560 exits to process 600 as a result of the event bit being set, the steps of the process 600 are performed, as shown in FIG. 2C. The existing metadata segments in the VS are all written to the NVS as the current checkpoint of the metadata (step 610) and the log in VS updated to reflect these transactions. Then, the portion of the log in VS that has not as yet been written to NVS is checkpointed (written) to NVS (step 620), and the completion of a "clean" shutdown is reported (step 630). When the shutdown is performed in this manner, the stored log may be processed at startup so as to update the metadata to the time of shutdown.

Alternatively, the stored log and the volatile log may be used to update the metadata prior to shutdown, so as to minimize the time to re-start. As such, one will appreciate that the steps described may be performed in various orders, and some steps may be omitted or added, depending on other aspects of the design, and this specific example is provided so as to facilitate understanding of the overall concept.

When the shutdown is a "dirty" shutdown, the metadata and the log stored in the NVS may not represent the current state of the other information stored in the NVS, and the metadata needs to be updated prior to use.

A recovery request is received (step 710) so as to initiate the recovery process, as shown in FIG. 3A. The checkpointed metadata segments are read from the NVS to the VS (step 720). The log data is read, from the NVS to the VS for the period starting with the earliest "last" PgmSeqNum associated with the checkpointed metadata to latest log information, and moved to VS (step 730). The checkpointed here would be the last complete set of the segments of the metadata that have been stored to NVS, although they may have been stored segment-by-segment over a period of time.). The log now in VS may be processed from the oldest entry to the latest entry (step 740) so as to enter all of the transactions in the metadata (step 750). At this juncture, the metadata in VS has been updated to a time when the log was last checkpointed to NVS.

In an aspect, the individual transactions may not be written to the log in a strictly time-order fashion, providing the PgmSeqNum associated with the actual time of performing the transaction is correct. When using the log stored in NVS to update the stored metadata prior to discovering "lost" data, the last PgmSeqNum of the log stored in NVS is considered to be the last valid PgmSeqNum, and log data associated with PgmSeqNum grater that that of the last valid PgmSeqNum is not used in the metadata recover. Rather, the data associated with the higher PgmSeqNum is considered to be lost and may be discovered by the discovery process. The stored log is ordered by PgmSeqNum prior to being used to update the stored metadata.

The next steps of the method are intended to find or "discover" any sectors, pages or blocks of the flash memory that were written to, or erased, between the last checkpoint of the log and the crash. The system processes will have moved all "live" pages and written them to free pages in another block prior to a block erasure. Therefore, "live" pages that were in an erased block may be presumed to have been moved, and will be recovered, even if the move had not been recorded in the metadata and log in NVS. During the recovery operation, which may be the process 800, the metadata that had been stored in NVS, and which may not be up to date, has been updated by the process 700, and has, for each block, a variable "MaxPage" whose value points to the highest page number in the flash memory block where a live page is believed to be stored. Since the pages in a physical block of flash memory are written in sequential ascending order, all blocks above MaxPage in a block are presumed to still be in the erased state of all "1". This includes the page local metadata. Any page above MaxPage in a block having data written therein, must therefore have been written after the last time the metadata was checkpointed (as updated by the stored log, as in the process 700) and is considered therefore to be "discovered" data. The metadata for the discovered page is written to a recovery log. Except for corner cases, some of which are described elsewhere herein, the page MaxPage is expected to contain data and local metadata related thereto, as would be true for all pages less than MaxPage, unless all of the pages below MaxPage had previously been moved by writing the contents to other blocks and the flash memory block had been erased.

The actual contents of the flash block are verified in process 800. The updated metadata, from process 700, are read for each flash block in the device (step 810). In particular, the MaxPage value, MAX, for the flash block is read. At least one of the data or the metadata for the page MaxPage=MAX is read (step 820). If the data is all "1", then the page had been erased. There is the possibility that new data, to be discovered, has been written to pages below MAX. As such a Yes decision at step 830 results in branching to step 840 where the page number is set to "0", since any new data written to the flash block will start at the lowest block number and proceed in page increments in an upward direction. So, page "0" is read, and the information read is evaluated to determine if new data has been written to the flash block. If the result is that all of the data bits are "1", this is the erased state, and thus one may conclude that no new pages can be discovered in this flash block, and at step 860, with a Yes result, the process 800 concludes for the particular flash block.

If data is discovered in the page "0", then the local metadata for the page is reported as having been discovered and the local metadata for the page is stored in the recovery log (step 870). The page number is incremented by one (step 880) and the data read from the next highest page. Step 860 is again performed and, depending on the result, the scanning continues incrementally higher in the flash block as new data is being discovered, or until a page which has not as yet been written to (programmed) is found, at which point all of the new data to be discovered in the flash block has been accounted for.

However, if the result of step 830 is No, then all of the pages below MAX had previously been written, and the transactions had been accounted for in the metadata, as updated by the process 700. The page number is incremented (step 850) so that the next highest page above MAX is evaluated (step 860). If the data is all "1", then no data has been written to this page or any higher numbered page in the flash block, and there is no new data to be discovered. The process 800, for this flash block, exits. Where the data was not all "1", then new data has been written to this memory block since the updated metadata was valid, and this new data is thus discovered. The discovery is reported and recorded in the recovery log (step 870) and the page number again incremented (step 880) to determine if any further pages have been written to the flash block, until such time as all the pages of the memory block have been scanned, or step 860 determines that the block has not been programmed. The scanning of the flash block has then been completed. The process 800 is performed for each flash block. All pages above the highest page having discovered data in a block are free pages, as they have not been programmed.

Many flash blocks will only require the boundary scanning, as the individual pages of a flash block need be scanned only if the boundary scanning indicates that there is data to be discovered in the block. That is, the method performs a scan of memory blocks so as to determine if a write or an erase may have been performed after the updated checkpointed metadata was valid, and scans only the pages of such a block needed to recover changes to the metadata after the time that the updated metadata was valid. In a case where MaxPage=MAX_BLOCK, then the largest page number in the block is the only one that needs be evaluated if there has been no change to the block.

This method has been described with reference to particular steps performed in a particular order; however, as with the other examples described herein, it will be understood that the steps, functions, or actions may be combined, sub-divided, or reordered to from an equivalent method. Accordingly, unless specifically indicated herein, the order and grouping of such steps, functions, or actions, is not intended to be interpreted as a limitation.

The individual chips may be combined into a memory array or system of larger size and may be mounted to a circuit board so as to form a module. Similarly, a plurality of modules may be mounted to a mother board, substrate, or the like, so as to form a still larger memory system. The data integrity in a memory system may be further enhanced by one or more redundancy techniques, such as error correcting codes or RAID.

While the recovery of the metadata to a current state has been described at the level of a memory system where a plurality of blocks is considered, the method may be used at higher levels of a system, where the lower level metadata may be considered as data, and such issues as failed modules may be considered as the equivalent of bad blocks.

Where the data processing in this example is shown as being performed by a computer, the computer may be a memory controller or memory management circuit located on a circuit board that is a substrate or module containing the memory, or be connected to such a module by a bus, so that the data may be processed in another component of a larger system. The bus used for communication with other aspects of the system may be any of the varieties of bus architecture, industry specification, or proprietary format now known, or which may be developed, that is compatible with the product with which the memory system may be designed to interface. Such busses may, for example, emulate the interface characteristics of rotating magnetic disk storage systems, or be extensions or improvements thereon, such as extensions to support RAID like operation of modules located on said busses, such extensions may include additional information used for synchronization of data amongst RAID groups or, for example, time synchronizing the operation of the modules.

In an aspect, instead of searching all blocks to find writes to the NVS that had not as yet been written to the log, a smaller number of blocks could be searched if the policy for selecting where to write new data can be followed in whole or in part, from the reconstructed state of the system.

For example, if the policy is to write into the block with the most free space and after processing the log there are 3 blocks with N free pages and 5 with N−1 free pages, then only those 3 blocks with N free pages would have to be checked. If there were pages written to all three of those blocks, then they would now have N−1 free pages, so now the 8 blocks with N−1 free pages would have to be checked. If new pages were only found in 7 of the blocks there would be no need to check any of the blocks with N−2 free pages as they would not be written to before the remaining block with N−1 pages.

To find any block which might have been erased, but not have been logged, it may be sufficient to check only those blocks with no 'live' pages, where the policy is that blocks are not marked for an erase operation when they still have live data.

In an aspect, the data may be striped across a number of memory modules, or across a plurality of memory circuits or chips of a module, so as to implement a RAID redundancy configuration, or a hierarchy of such configurations, which may be differing versions of RAID. Such configurations are compatible with the approach of the first example, as is illustrated in a second example.

In another example, the memory system may be organized as an array of modules connected by a bus system. A bus-connected array of memory modules has been described in U.S. Ser. No. 11/405,083, Interconnection System, filed on Apr. 17, 2006, which is commonly owned and which is incorporated herein by reference. A module of the bus-connected array may have the volatile storage 20 and the non-volatile storage 30 of the first example herein, and may have a bus interface or local memory controller 10. Recovery from a crash may be performed for each of the memory modules individually as described above. Bus-connected memory systems may have additional protection against data loss by the use of RAID techniques, as described in U.S. Ser. No. 12/079,737, Memory Management System and Method, filed on Mar. 26, 2008, which is commonly owned, and is incorporated herein by reference.

Figure 4:
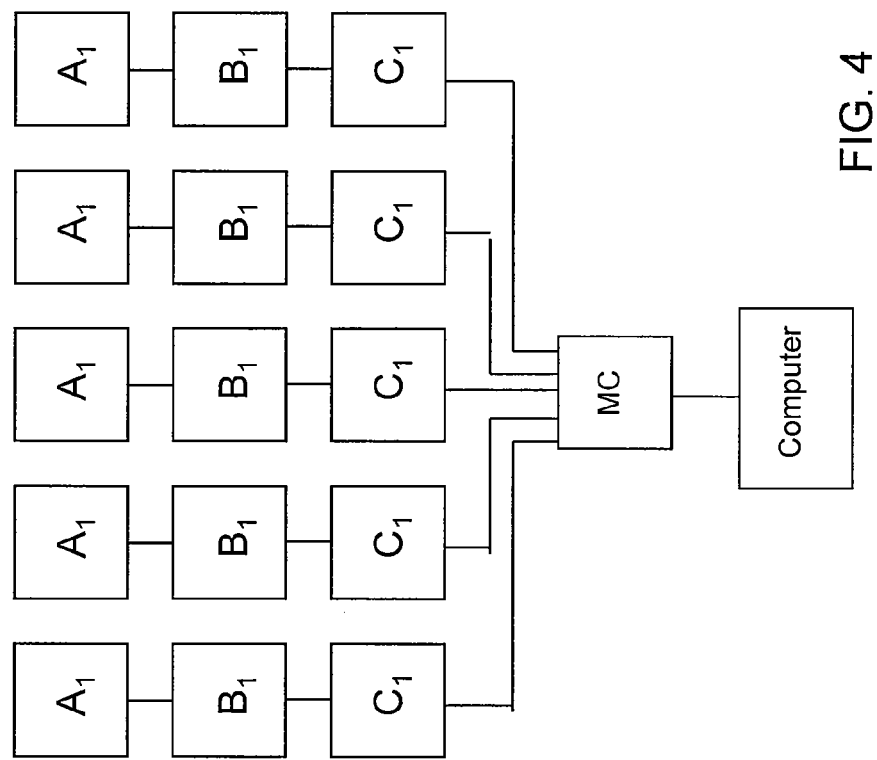
FIG. 4 is an example of a data structure for an array A stored on a plurality of memory modules, which may be a logical or physical arrangement of memory modules.

FIG. 4 shows the logical organization of data which may be stored on different memory modules so as to realize a RAID 5 organization with 4 data modules and 1 parity module. Each LBA may be divided into a group of four smaller LBA ranges (for example, sectors) and stored on different memory modules. A parity value for each group of LBA ranges may be computed and stored on a fifth memory module. Such an organization of the data storage permits the recovery of data when a memory module fails or is otherwise unavailable when a data read is to be performed. As described in application Ser. No. 12/079,364, the memory system of FIG. 4 may be operated so as to return valid data using the data from only 4 of the 5 modules. As such, the operation of the system may continue while the RAID data structure is being rebuilt after, for example, replacement of a failed module.

In an aspect, data A is stored as four sequential areas of data A1, A2, A3 and A4 on separate memory modules, and the parity Ap is stored on a fifth memory module. At each memory module the LBAs associated with the sequential areas of data may be the same, and as the SeqLba value for the LBA in each module may have been previously initialized to zero at a reset or initialization, all of the modules in the stripe for the particular data area A will have received the same number of sub-blocks of data (which may be sectors) since that time. The sequence number value SeqLba may be stored as part of the metadata in each module. As such, when the data for A is read from the memory modules and reassembled, each of the subsets of data A1, A2, A3, A4 and Ap may thus be expected to have the same value of SeqLba.

RAID may be used to recover data where a module, or a portion thereof, has failed. Since the local metadata for each of the individual modules will have been recovered if there had been a crash, as previously described, the local metadata of the recovered LBAs will still have the correct sequence numbers SeqLba. The data from remaining 4 of the 5 modules may be used to recover the data of a failed module, by reading the data from the 4 valid modules and computing the XOR of the data. The resultant data is the data that has been lost from the remaining module. So, after a failed module has been replaced, the data may be fully recovered and restored. In an aspect, the data may continue to be accessed during the reconstruction of the data of the failed module to a spare module, or during the repair of the hardware, which may be by replacement of the failed module, and may be performed on a hot-swapping basis. A PgmSeqNum or other index for the data may be present in each of the separate metadata sets for each module corresponding to the stored A1, A2, A3, A4 and Ap (one of which is lost due to the module failure), and therefore the SeqLba for the recovered data may also be known. The PgmSeqNum for the recovered data set may be re-initialized when it is restored to the NVS.

When the contents of a failed memory module are reconstructed using RAID, the reconstructed data may be stored in a replacement or spare module, and metadata associated with the storage of the data on the module may be created contemporaneously The locations of the memory modules within a memory system may be physically different from the logical arrangement shown in FIG. 4. However the arrangement of FIG. 4 may also represent a physical memory system where a plurality of memory modules are organized in a linear bus and connected to one or more memory controllers.

Figure 5:
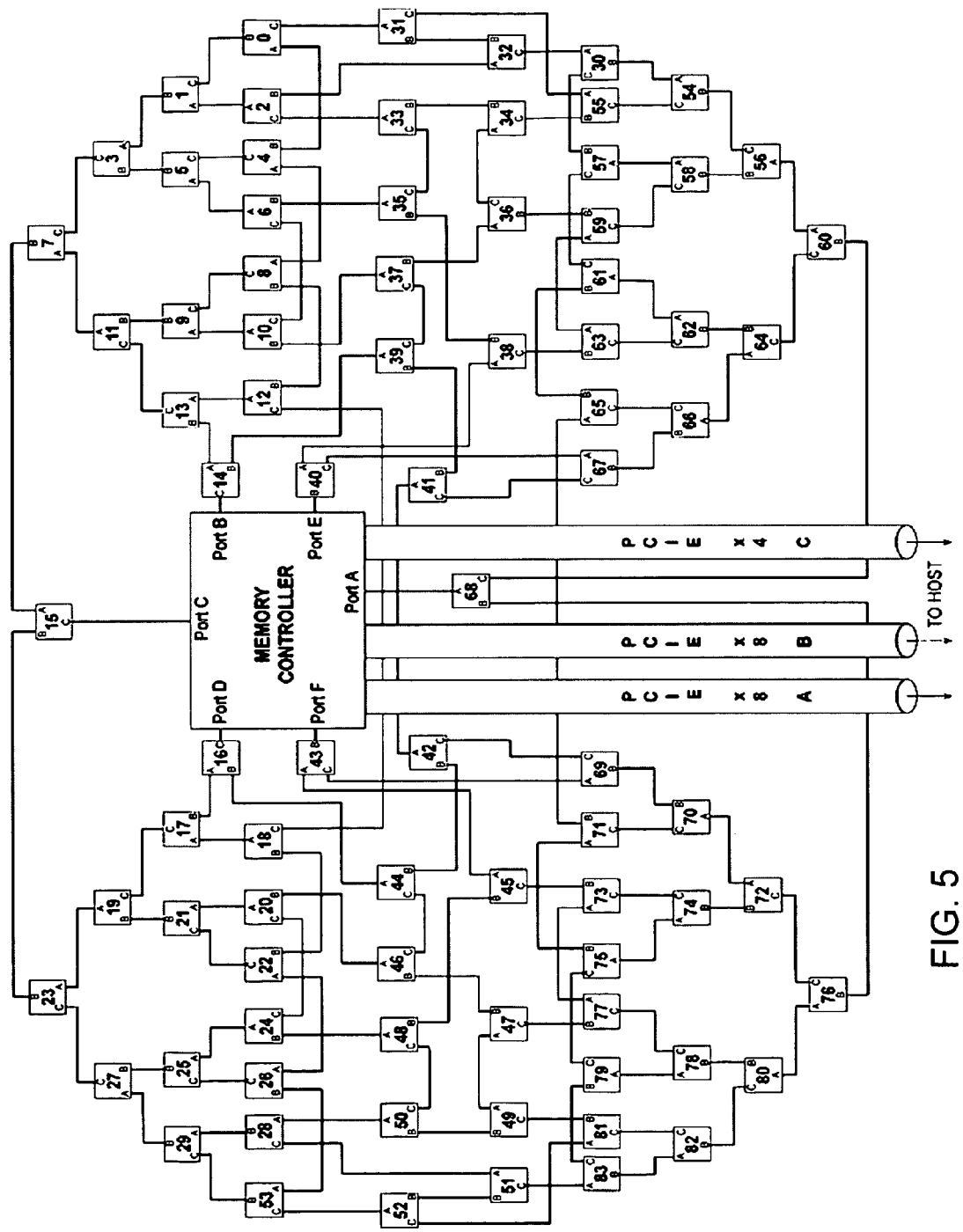
FIG. 5 is an example showing the assignment of logical data elements to physical modules of a memory system, where the physical arrangement of modules is in a binary tree with multiple roots.

In another example, a tree-type memory system is shown in FIG. 5, where the memory modules associated with a stripe of a RAID 5 arrangement corresponding to the logical arrangement of FIG. 4 is shown. The corresponding physical modules are D1, D2, D3, D4 and Dp. The assignment of the data sub-arrays A1, A2, A3, A4 and Ap to physical memory modules D1, D2, D3, D4 and Dp may be made using a computational algorithm, look up table, or any other suitable technique.

In yet another example, a detailed design of data structures compatible with performing data recovery operations is described. In an aspect, the example is directed to storage of data in a logical-block-addressable format. Other data storage formats which may be used include file system storage, object data stores, NV computer main memory; some types of storage formats may be layered on top of a block based storage system, while still others could integrate aspects of the present application o within an overall data management structure.

This detailed design is one of many possible designs and includes details which are provided to place the data structure design in the context of a memory system. As such, not all of the features and operations described herein may be needed in any particular design, and features may be added or deleted in accordance with the needs of the developer. Further, while this description is somewhat more detailed than the other examples, a person of skill in the art will realize that there remain a wide variety of housekeeping and other operations which may be performed, and which are not described in detail. Additionally, some portions of the data structure are not described, or are shown but are not described in detail. These portions may provide a reserved space for further development, or for the implementation of features which are not the subject of this application, or are described elsewhere herein. Omission of any feature in the example is not to be taken as precluding the addition thereof in a specific design, depending on other factors, such as economics, optimization of specific performance characteristics, or the like.

While the data may be protected against loss due to a hardware failure at the module level, or a higher level in the system by a RAID technique, EEC (error correcting code) or the like, in this example, the operations associated therewith are not described, and such operations are considered to be subsumed in the read and write operations that are commanded for execution.

For the purposes of this example, the hardware of a module may include the functional areas shown in FIG. 1, where the non-volatile storage (NVS) 30 is a flash memory, which may be a multi-chip device, the volatile memory (VS) 20 is DRAM, and the computer 10 is a microprocessor, field-programmable-gate-array (FPGA), state machine, or the like, which itself may include local memory; the local memory may include volatile (VS) and non-volatile memory (NVS), including memory for local storage of program data. Alternatively, such program data may be loaded from another memory or computer readable storage device. The computer 10 may also include the circuitry for interfacing with an external bus, or have forms of interface to the remainder of the system. The hardware may be located on a single circuit board or substrate, or a plurality of the same.

In this example, and not by way of any limitation, a module may include from 8 to 16 flash circuits, each flash circuit (package) having 8 flash chips. A flash circuit (NVS) may have a capacity of 1 GB, so that 8 flash circuits would have a capacity of 8 GB and 16 flash circuits would have a capacity of 128 GB. The flash memory chip may be characterized as having a programming time (write time) of 200 usec typical and 700 usec maximum, a page read time of about 100 us, and an erase time of 1.5 msec typical and 2 msec maximum. The circuits are organized to communicate with the computer 10 over local busses having a capacity of 20 MB/s for a total module capacity of 160 MB/s. The volatile memory (VS) may be RAM, organized as 8 bits wide with a clock rate of 125 MHZ. The storage capacity of the RAM memory may be about 2 percent of the storage capacity of flash memory (0.5 to 2 GB), with the addition of an area for error correcting code (ECC).

The design in this example is consistent with the RAID architecture disclosed in U.S. Ser. No. 12/079,737, so that erase operations on the flash memory have little or no impact on the read latency, and write operations at a rate of up to a substantial fraction of the maximum write bandwidth have little or no impact of the read latency. This is merely an example of a design constraint that may be imposed. The data structure and method is intended to facilitate recovery of the metadata for the non-volatile storage on the module in the event of a crash.

For the purposes of this example, the following terms are used for convenience in describing the memory addresses:
  Basic Data Unit (BDU) which may be 2*512 byte sectors plus a spare data area; the "spare area" of a BDU refers to the spare area of both sectors of the BDU considered as a single entity;
  Quad Data Unit (QDU) which may 4*BDU or 4 Kbytes;
  Octal Data Unit (ODU) which may be 2*QUU in adjacent memory locations; a block, which is a plurality of ODUs; and
  2block which may be a address in memory formed by treating block "i" and block "i+1" as a single block; the 2block is indexed as 2Block[i/2], where "i" is an even number.
  Blocks may be described as containing one type of information, and this may often be done to simplify the implementation or to make certain operations more efficient, or to reduce the record keeping required by allowing some structures to be tracked on a block-by-block rather than page-by-page basis. However, this is not intended to be a limitation. For example, map table (MT) and block table (BT) checkpoints may stored separately, but they could as well be stored in checkpoint blocks (CPB) containing both types of data. Log Blocks (LB) and data blocks are stored separately but the log could be stored in data blocks, or in checkpoint blocks. Root blocks (RB) and index blocks (IB) could be merged, root blocks (RB) could be stored in arbitrary locations and found by searching the spare areas for a special marker: similarly with index blocks. Both root blocks and index blocks could be eliminated entirely and the location of the checkpoint and log segments discovered by searching for some identifying marker. So when a field or function is described as being in a "block" of a certain type, the description could be read as a "page" of a certain type, or even "sector" of a certain type depending on how finely the different data types are interleaved.

The primary addressable memory unit of this example data structure is the BDU, and the spare area of the BDU may be considered to have been addressed when the corresponding BDU is addressed. Data in a BDU may not be addressed as such, but may be extracted from the referenced BDU. FIG. 6A shows the bit assignments in a typical index word, having a length of 28 bits.

For purposes of discussion, Samsung part numbers K9KAAG08U0M through K9NCG08U5M (Samsung, Seoul, Korea) are considered, each part having a capacity of 2 GB per chip select line. The physical memory address of a sector in a 2Block is specified by bits 0-2 for the BDU, bits 3-8 for the ODU, and bits 9-20 for the position in the 2Block, and Bits 21-23 are for bus select. Bits 24-28 may be assigned to functions based on the specific configuration of memory circuits used. Where 8 packages are used, then bit 24 or bits 24-25 may be used to provide for chip selection. Where 16 packages are used, then bit 24 may select between the two packages on a bus, and bits 25-26 provide the clip selection as shown in FIG. 6B.

Figure 7:
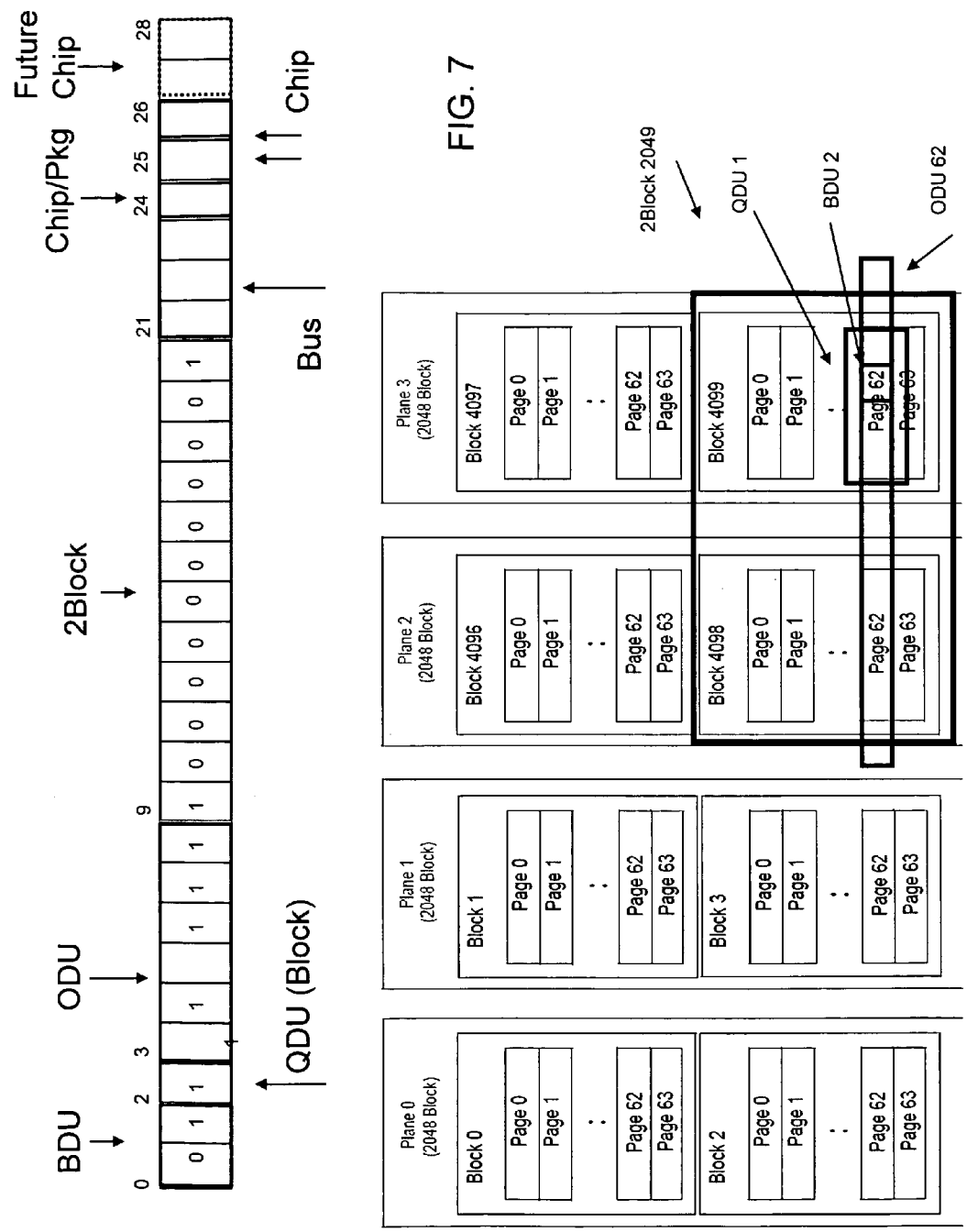
FIG. 7 shows an index word as being used to locate a specific basic data unit in a memory array.

FIG. 7 shows the use of an index word to identify the memory location of a specific BDU on a chip. The bit pattern of the index word locates the BDU as being BDU 2 of QDU 1 of ODU 62 of 2Block 2049.

There may be several global variables on a system or module basis. The system may have a counter with granularity of 1 microsecond and a roll-over time of 1 second. This may be used, for example, to synchronize the erase and write operations of RAID columns. A module program sequence number (PSN or PgmSeqNum) having a length of 40 bits may also be used, which counts the operations actually performed. The PSN may roll-over (wrap) perhaps every several weeks, depending on the clock rate. A background refresh operation may be needed so as to maintain the stored PSNs to within 2^38 of the most recent value of the PSN.

Figure 8:
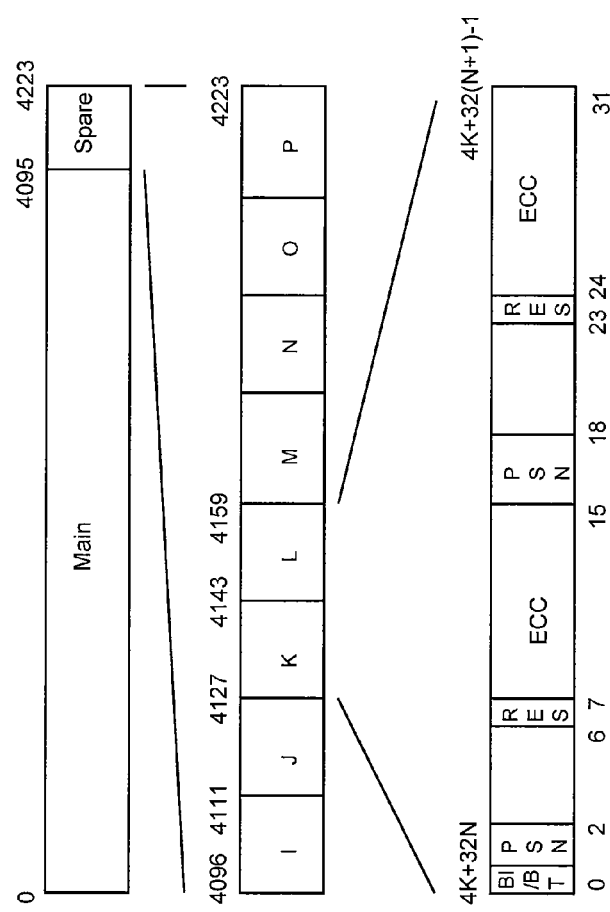
FIG. 8 shows the data structure of a quad data unit of memory (QDU)

Each page (QDU) may have a spare area as shown in FIG. 8, where the auxiliary data is stored. The data area of the QDU is sized at 4096 bytes, and the spare area at 16 bytes per sector. Since the BDU is the concatenation of two sectors, the spare area allocated to a BDU is 32 bits. One of these spare data areas, corresponding the sectors K and L, is shown in detail as representative of the other spare data areas. A 16 byte area is provided for ECC to protect the integrity of the data area and the spare area; the ECC may, for example, be divided into 2 portions: one for the data and one for the spare area, so as to allow the spare area to be read and verified without requiring the data to be read. In addition to, or in place of, ECC other data protection algorithms such as a CRC may be included, with differing coverage ranges; for example, the 16 bytes may be split into 12 bytes of ECC covering both data and spare area and 4 bytes of CRC covering the spare area, so that if the spare area CRC verified the data of the spare area the spare area data could be used without having to read the entire data plus spare in order to perform ECC check of the spare area. In another aspect, the 16 bytes could be split into an ECC covering the data, an ECC covering the spare area, and a CRC covering both areas. The PSN is stored as 5 bytes.

Figure 9:
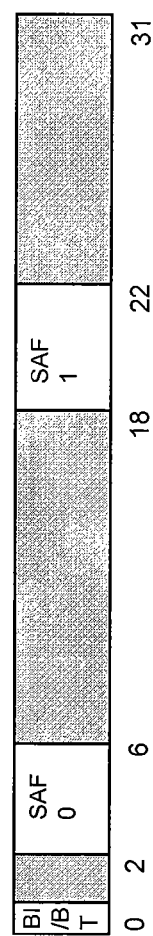
FIG. 9 shows the spare area fields in the spare area.

The block-type field stores an indicator that represents the type of information stored in the block. This may be a hexadecimal number and assigned as follows:
 0XFF=Root Block (RB)
 0xF1=Index Block (IB)
 0xF2=Block Table (BT) for Checkpointed Blocks (CB)
 0xF4=Map Table (MT) for Checkpointed Blocks (CB)
 0xF8=Log Block (LB)
 0x0F=Data Block
 0x00=Bad Block Other bytes may be reserved. The contents of the Spare Area Fields, SAF0 and SAF 1, depend on the block type, and are shown in FIG. 9.

Figure 10:
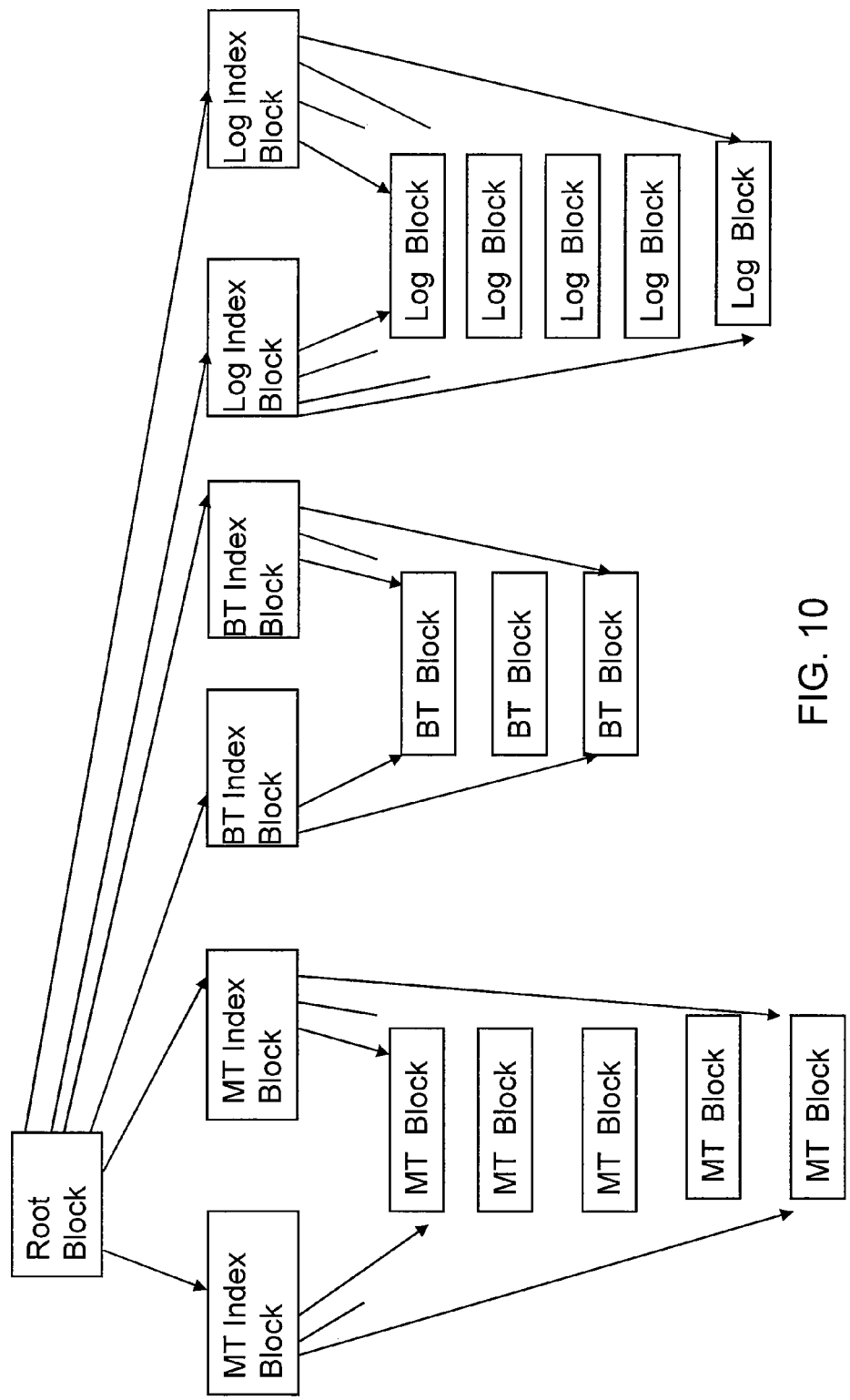
FIG. 10 shows the hierarchy of metadata structures for a 2-chip memory circuit.

Data structures relevant to the present example are shown in FIG. 10. Generally, the data structures in the flash memory (NVS) have a corresponding data structure in the RAM; however, there are several data structures found in the RAM but which may not be found in the flash. When discussing data structures, the term "block" may be used to refer to a logical data construct, each type of which may have different size and function. This use of the term "block" when used for a data structure, needs to be distinguished from the term as used to refer to the minimum erasable amount of contiguous memory of a flash chip, which is also termed a block.

A Root Block (RB) is allocated to each flash package and there may be, for example, 8 or 16 flash pages comprising the memory module. In this example, two Index Blocks (IB) are allocated to each bus. The Checkpoint Blocks (CPB) may be Block Table (BT) where there may be 32 BTs per 32 GB (32-512 block units. for example, 32 blocks to 512 blocks for a module size ranging from 32 GB to 512 GB+16 per module, and a Map Table (MT) where there may be 1K MTs per 32 GB (1K to 16 K)+16 per module. The MTs may be about 0.8 percent of the total storage area. The +16 provides for the situation that 32 BT CPB per 32 GB represents the actual number of CPBs needed, but as the old check point block for a range of addresses is not overwritten prior to writing the new checkpoint block, at least 1 more block is allocated than is needed to store the metadata. Having +16 locations allows for contemporaneous transactions with all 16 packages of a memory module. In the limit, only +1 block would be needed but the operation may then be limited in the number of parallel writes and, as a result, the rate at which checkpoint data may be written to NVS. For the BT, perhaps only one extra CPB may be needed.

The 1K per 32 GB Map Table (MT) size assumes one hundred percent of the data is addressable by the user; that is, a circumstance where all possible physical addresses in the memory could be filled with user data. However, in this example, no more than about 99.2% of the addresses could be used by the user, as about 0.8% of the chip memory is being used for the CPBs. Memory space is also needed for the log as well as memory blocks reserved to allow for replacing other blocks which go bad over the life of the part. Data sheets for typical products suggest that an allowance for failed blocks may be about 3%. Blocks may also be allocated for housekeeping operations such as garbage collection or wear leveling. So, the total user addressable space may be only 95% of the physical memory in system with little or no space reserved so as to improve performance attributes such as latency or write throughput. In some circumstances, however, less than 50% of the address space may be available to for user data. While the user data space is reduced from the physical data space by these system needs, the location of user data and system data in the physical memory may not be restricted to specific physical memory locations, except for avoidance of bad blocks.

A Log Block (LB) stores the transactions, and there are approximately 600 log blocks per 32 GB of memory. The number of LBs depends on the total amount of time to perform a full checkpoint of the CPBs, as the checkpointed LBs need to extend backwards in time as far as the earliest of the still valid stored CPBs. If check point blocks are written to NVS at a fixed rate, then the approximate maximum memory size of the log is determined primarily by the number of BDU writes that can be performed during the time taken to write a full checkpoint of the MT and BT tables to the NVS. When the memory space available for the log is fixed, the speed at which the checkpoints have to be written may be determined by computing how fast the log can be filled.

In an aspect, the speed of checkpointing may be varied so that when the system is mostly idle and few entries are being made in the log, checkpointing may then proceed more slowly.

In yet another aspect, the checkpoint can also be written based on how much data has been written to the log rather than how fast the log has been written based on, for example, the ratio of the sizes of the checkpoint region and the size of the log, so that a full checkpoint may be performed before the full log area has been written with log entries.

The Data Blocks (DB) are the area for storage of user accessible data. A Bad Block (BB) is a block which has been declared 'bad' for any reason. The bad blocks may be tracked for various reasons by keeping a list of such blocks, in this case in the Root Block, such tracking is not required for operation of the system as the Block Table entry of the block will also be marked bad which will prevent it being used to store data.

The Root Block (RB) may conveniently be block 0 of a chip, although other locations may be used. This block may be infrequently programmed or erased after initialization, and is primarily devoted to record keeping with respect to the chip on which it is located. Such information as the manufacturer information (manufacturing date, production lot, and the like), current position of the module in a system and the memory package on the module, and metadata information may be stored. The RB metadata may comprise, for example, a list of index block (IB) addresses, the number of log and CPBs, and an initial bad block list. The root blocks (RB) point to the index blocks (IB). The initial bad block (BB) list may provide for initial bad blocks for each package. The initial bad block list may be only for the memory blocks located in the same package as the root block, while subsequent bad block lists may contain addresses for memory blocks located anywhere in the module.

Figure 11:
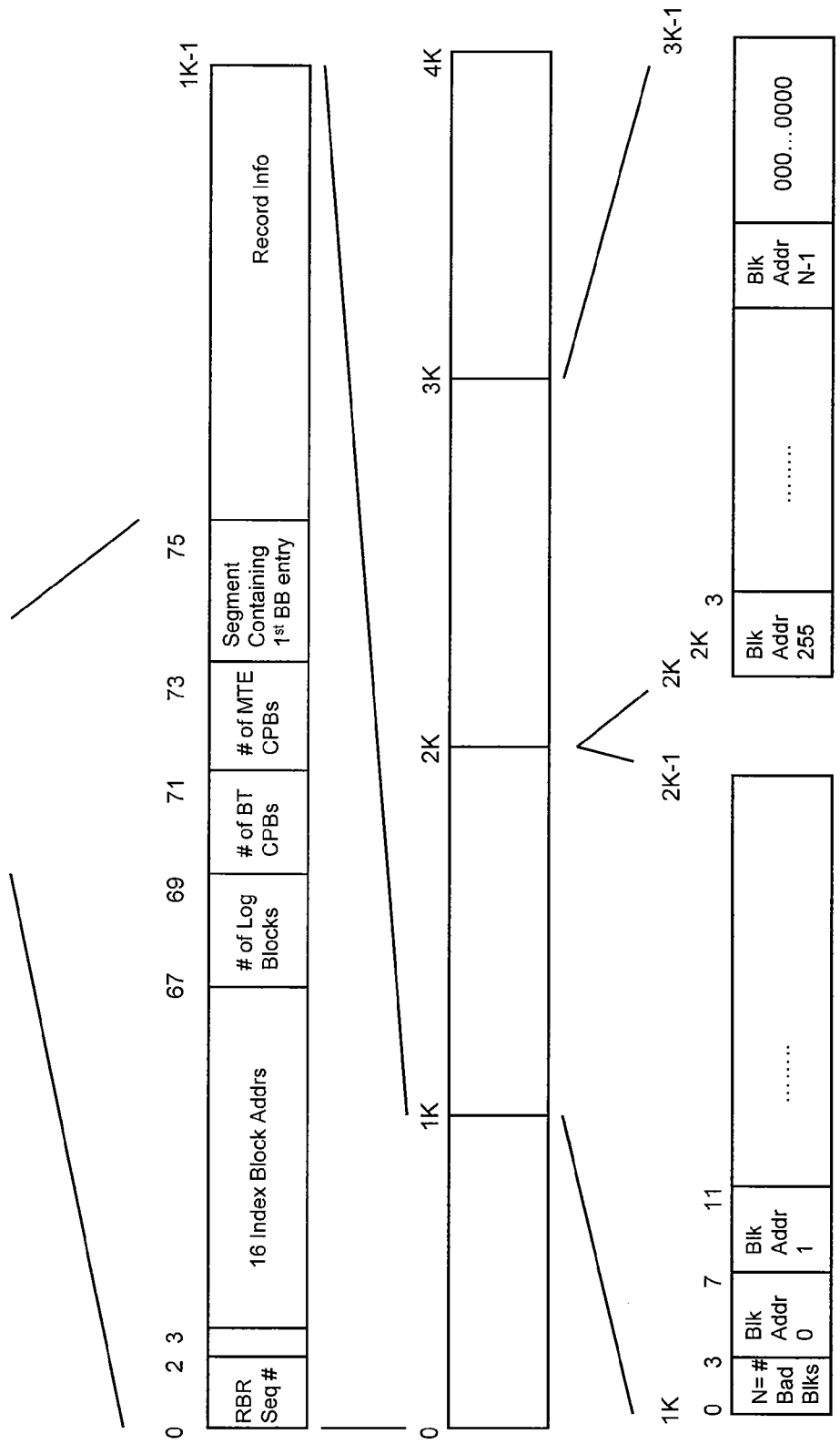
FIG. 11 shows the data structure of a Root Block Record (RBR)

The Root Block record (RBR), shown in FIG. 11 may have a fixed-size header of 76 bytes, and the remainder of the first BDU may contain information such as manufacturing information, such as a serial number/lot number/date of manufacture, information about other components on the module; relatively static information such as the location of the module in the system, and a system ID number identifying the specific system in which the module has been installed so that if the module is removed from the equipment and installed in a different system the module can be detected as belonging to a different system, so that the module data is not unintentionally used or overwritten The remaining BDUs of the QDU may contain information relating to bad blocks. The bad block records may begin with a count of the number N of bad blocks, followed by the addresses of the first 254 bad blocks. The list of bad block addresses may continue into the next BDU if N is greater than 254, else the remainder of the BDUs in the QDU are either not written, or zero filled. To change the data for the index blocks, or to add new bad blocks, a new RBR is written, typically at the end of the previously recorded RBR. The new RBR may start on a QDU lower boundary, although this is not required.

The Root Block (RB) may also have a spare area that may be similar to the spare areas for other BDUs, and is shown in FIG. 12. The type field value is 0xFF, and any other type value indicates a bad block. Two of the areas that were shown as reserved in FIG. 11 are used in the RB. A same 24 bit RBR sequence number SAF0 is assigned to all of the BDUs in the same RBR, and a 24 bit erase block count (EBC) SAF1 is assigned such that all programmed pages in a RB have the same EBC. The RBR of the Root Block (RB) written to a new RB if there is no more space in the block to write the new version of the RBR. When updating is due to a change in index blocks (IB), all of the Root Blocks (RB) may need to be erased. No new RBRs are appended to the RB after the last valid RBR; however, if there is not enough space to store a new entry, then the RB will have to be erased. If all of the RB were to have been erased at the same time, and the power failed, then there would be no valid RB to boot from. The number of RB that may be erased thus may depend on the policy used for selecting a valid RBR from which to boot. If the policy is to pick the single most recent valid (error free) RBR then, so long as one RB remains, the system may be booted without a more complex recovery scheme. In an aspect where the policy is that there must be at least N valid RBR that are identical, then at least N RBs must remain un-erased while writing new RBRs to an erased RB.

Index Blocks (IB) 0-7 point to the location of Block Tables (BT) and Checkpoint Blocks (CPB), while IB 8-15 point to Map Table (MT) blocks. The Index Block (IB) spare area is shown in FIG. 13. The configuration is similar to the RBR spare area in that the field type is 0xF1 signifying an IB, and the variable SAF0 comprises a two-bit type field and a 22 bit IBR sequence number. All segments in the same IBR have the same sequence number. The SAF1 is an EBC similar to that in the RBR. The 2-bit type field indicates the type of index data the index block points to: BT (00); (01) LB record; and, MT record (MT).

Figure 14:
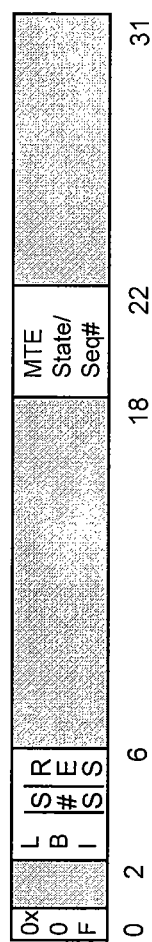
FIG. 14 shows the data structure of the Map Table (MTE) spare area.

Each memory block has a size of 256 KB; however, as described above, a pair of memory blocks may be combined to form a single 512 KB block so as to permit dual-plane operation. Such a configuration takes advantage of specific architectural features of existing mass market components, and is not a requirement of the design. This configuration thus has 512 1 KB BDUs on each pair of chips. Each block has a spare area and the particular features of the block spare area are shown in FIG. 14, where the type field is 0x0F. In this example, the value of SAF0 is a 30-bit logical BDU index and a 1 bit Seq# set field.

The Seq# set field may be used when the sequence number is set to value different than a value one greater than the last sequence number for the logical address. Such a circumstance could occur in the case of RAID reconstruction into a spare module where the spare module has only initialized values for sequence numbers, or where a module has lost synchronization with the other modules of a RAID group. This may occur, for example, when a power failure occurs after some, but not all, of the modules had had new data written to NVS. For example, if only one module of a RAID group had had written data to NVS, then the write operation of the RAID group would not have been completed. The previous data values would have to be restored, either by, for example, recovering the old data by finding the locally on the module, or being reconstructing the data using data from the other members of the RAID group. These operations may now have stored at least two instances of data for a given logical address in the NVS: one instance with a smaller Seq# but a later PSN; and, one instance with a larger Seq# but an earlier PSN. Should the power fail prior to writing the relevant metadata to NVS this may result in incorrectly subsequently recovering the state of the NVS: the location with the larger Seq# may be incorrectly assumed to be the most recent version. A Seq# set bit indicates to the recovery process that determination of the most recent of the entries by comparing the (smaller) Seq#s may not be correct; but, rather, the recovery operation may proceed, for example, by comparing (larger) PSNs. However, since the PSN for a given entry was not stored in RAM, this comparison may be made by reading the entry in NVS which is currently considered the most recent, so as to compare it to the entry which was found during the recovery portion of booting.

The SAF1 field is a structure in the NVS which contains the contents of the second half of the MTE stored in RAM: the State+SN portion. The first part of the MTE in RAM may not need to be stored in the NVS as the first portion contains the physical address in NVS at which the LBA is stored, and which is known from the SAF1 field being read.

When the system is re-started after a clean shut down, the incrementally stored checkpointed metadata, stored in the NVS, represents the latest state of the memory, and correctly points to the location of data of LBA stored in a physical memory location, as there was sufficient time to update all of the checkpointable metadata in RAM using the volatile log, and to store a complete version of the updated metadata as the checkpointed metadata in NVS. Alternatively, when a clean shutdown is performed by storing the recent log file segments rather than the complete metadata, the metadata stored in NVS and read to VS is updated by the stored log data. However, as previously described, a "dirty" shutdown may result in an incomplete image of the current dynamic metadata, and volatile log data and the "lost" data needs to be "discovered", using the techniques previously described.

Figure 15:
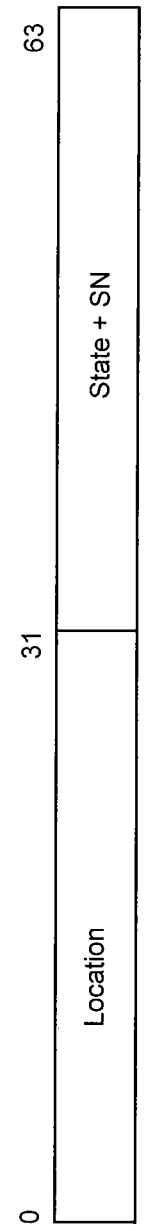
FIG. 15 shows the data structure of a Map Table Entry (MTE)

A Map Table Entry (MTE) may be a 64 bit word, as shown in FIG. 15 where 32 bits are allocated to the LBA location address and 32 bits are allocated to serial number and state information. The location data points to the address of the data in the flash memory, when the MT is the MT in the NVS; or, when the MT is the cached MT, the location data points to a cached BDU descriptor, which contains the flash memory address. The MTE word location field is further described in FIG. 16 for circumstances where the BDU is in flash (V0) or in DRAM (V8). V12 may be used to avoid having to write data to NVS which is comprised of some fixed pattern, such as all 1's or all 0's, common test patterns such as 0xf0, 0x5a, or the like. In this situation, the type field informs the interpretation of the pattern field.

Figure 17:
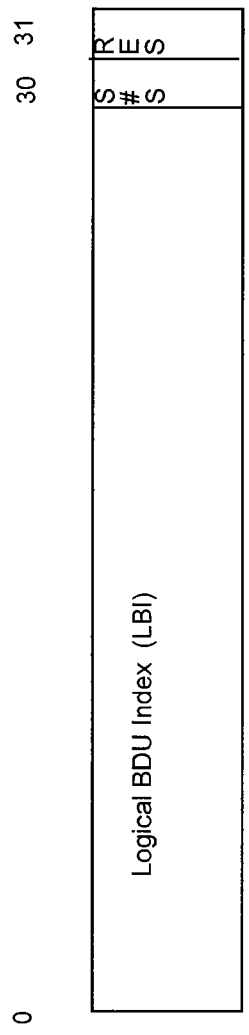
FIG. 17 shows the data structure of the MTE location field in the spare area.

In an aspect, when the pattern is a simple repetition of the same 2 bytes, then the value of the type field would indicate to use the pattern field directly. In another aspect, when the pattern in the data was some well known filler pattern such as 0xdeadbeef, 0xfeedface, or the like, then the value of the type field would indicate that the pattern field was an index into a predetermined table of such patterned data, or the pattern field may be an index into some dynamic table of learned patterns. Other type descriptors (e.g., V14 and V15) may be reserved. The MTE location field as used in the flash is shown in FIG. 17. The logical BDU address is 1 bit larger than the physical BDU address so that two address spaces may be accommodated.

When used with the log and the CPBs committed to NVS, the MTE location field may be any of the values used in the volatile memory (VS) versions, except for V8, which refers to the DRAM location. If the MTE location filed is V8, then the indicated cache descriptor needs to be de-referenced so as to determine the in-NVS state of the BDU, and the location field corresponding to the in-NVS state of the BDU is that which is placed in the log or CPB, as appropriate. By de-referencing the pointer, the data at the address value which the pointer points to is read, rather than the value of the pointer itself, which is the data address value.

Figure 18:
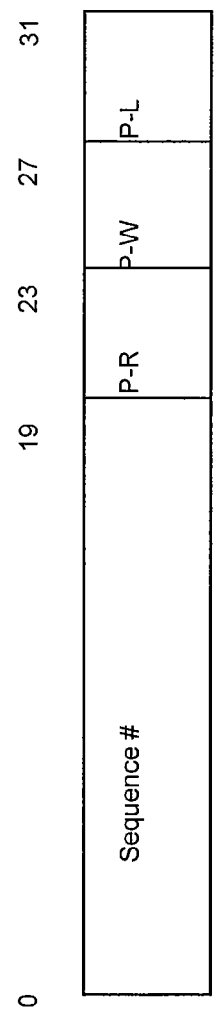
FIG. 18 shows the data structure of the sequence number field of FIG. 15.
Figure 19:
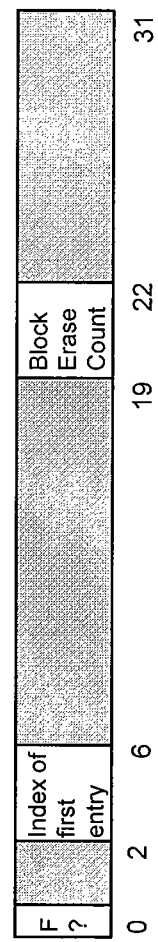
FIG. 19 shows the data structure of a checkpoint block (CPB) spare area.

The MTE state and sequence number (SeqNum) fields are shown in FIG. 18. A 20-bit SeqNum is used. A 4-bit behavior predictor may be allocated to each of 3 behavior predictors. The Read (P-R) predictor may be used to indicate the likelihood that other BDUs in an ODU will be read if the present BDU is read. The Write (P-W) predictor may be used to indicate the likelihood that other BDUs in an ODU will be written if the present BDU is written. And, the Lifetime (P-L) predictor may be used to indicate the likelihood that the BDU will be re-rewritten to the NVS before the flash version of the data is moved during a garbage collection operation.

FIGS. 20 to 25 show the various types of data entries in the log, denoted by the type field of the entry, which is stored in bits 29-31.

Type 1 is a Map Table Entry update shown in FIG. 20, and may be used when a BDU is written to NVS; Word 'A' contains the physical address of the previous location of the BDU; Word 'B' contains the Logical Address of the BDU; and, Words 'C' and 'D' contain the contents of the VS MT entry for this BDU.

Type 2 is a Block Write log entry, shown in FIG. 21, which may be used to record a write to NVS of metadata rather than 'user' data. Word 'A' may contain the PBI to which the write was performed, and the rest of the entry has various fields such as the type of the block, the PSN of the BDU, and may contain other data either for redundant checking, or to support the housekeeping and management functions.

Figure 22:
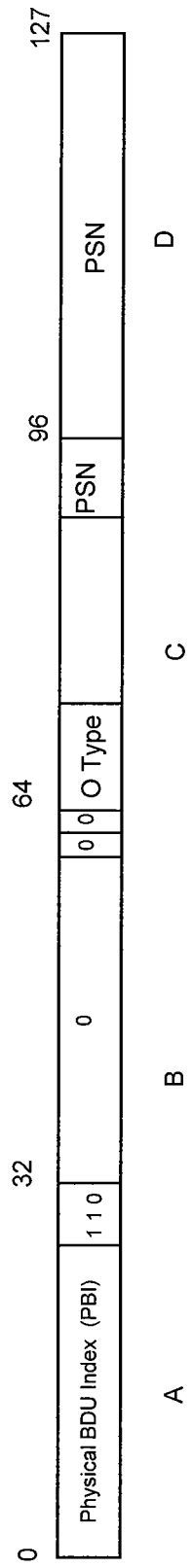
FIG. 22 shows the data structure of the log entry for a block erase operation.

Type 3 is a Block Erase log entry, shown in FIG. 22, which may be used to indicate the completion of a block erase. Word 'A' is the address of the first BDU in the block; the 'O' field in word 'C' is the type of the block being erased as a redundant error check; and, the PSN is the value of the PSN when the block erase was performed.

Figure 23:
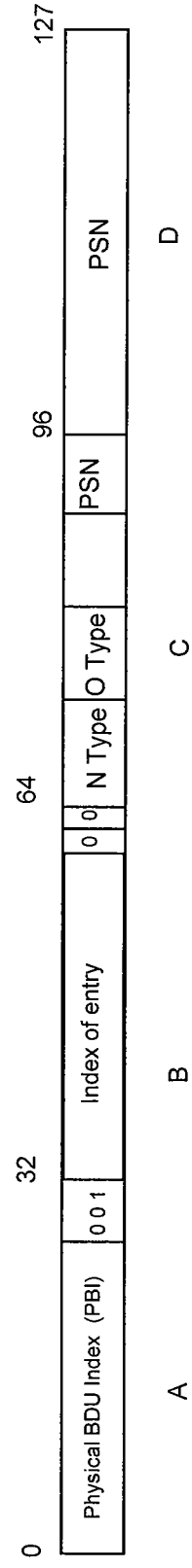
FIG. 23 shows the data structure for the log entry for a block assignment operation.

Type 4 is a Block Assign log entry, shown in FIG. 23, which may be used when the type of a block is changed; it is the same as a Type 3 entry with the addition of the 'N' field containing the new type of the block, and the index field in word 'B' which is used if the block is being assigned to be a checkpoint block to indicate the position of the block in the circular checkpoint buffer.

Figure 24:
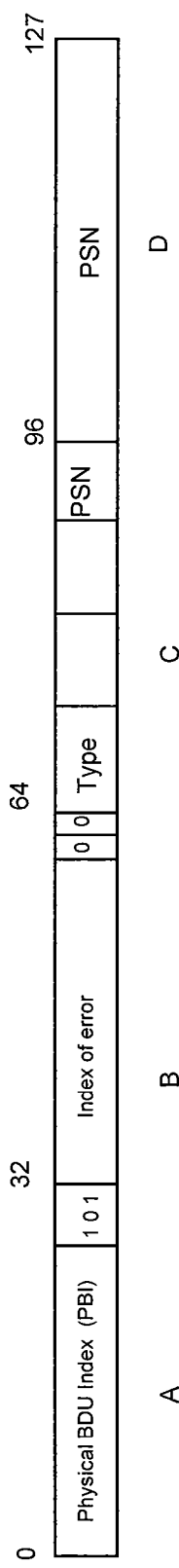
FIG. 24 shows the data structure for the log entry for a bad block.

Type 5 is a Bad Block log entry, shown in FIG. 24, which may be used when a block is declared bad. The index field in word 'B' contains the location in the block of the error that caused the block to be declared bad.

Figure 25:
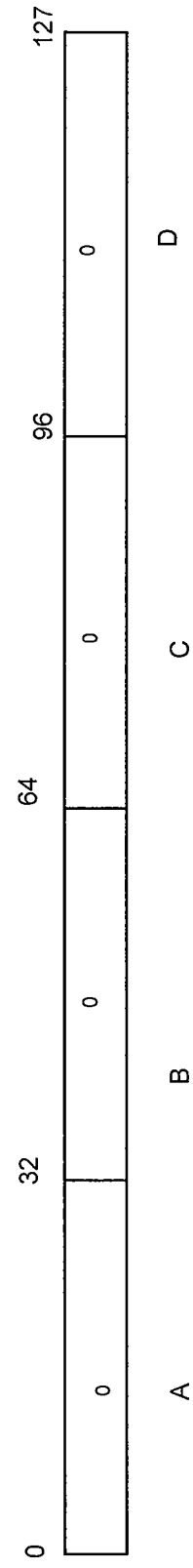
FIG. 25 shows the data structure for the log entry for padding the log.

Type 0 is a Pad log entry, shown in FIG. 25, which may be used to fill unused space in a log BDU when it is desired to write log BDU to NVS before the log BDU is full of data, such as on a system shut down, or after the writing of an entry into the log that is desired to have committed to NVS immediately: such as, a bad block entry.

The terms "garbage collection" and "wear leveling" are used to generically describe housekeeping operations that are performed in flash memory systems. Garbage collection relates to the processes of reclaiming "dead" memory locations created by the writing of data to a LBA located in the flash memory. The source data location in physical memory now contains out-of-date data and represents wasted space which needs to be reclaimed, so that an appropriate amount of free memory is maintained to permit continued write operations. Wear leveling generally relates to the processes of moving data in the flash memory so as to attempt to keep the number of memory block erase operations approximately equal over the blocks of the memory, so as to avoid premature wear out of the flash memory. Presently, flash memory circuits are rated by the manufacturers as having a lifetime which may be measured in the number of erase operations before failure. This is in addition to any conventional time-related failure-rate specification which may be given.

The sequence number SeqNum may be incremented every time a change is made to the BDU, regardless of whether this new BDU is committed to the NVS. The SeqNum may be used during the recovery from a "dirty" shutdown, however caused. Where RAID storage techniques are used, the SeqNum may be the same across all of the BDUs of a RAID group, wherever stored. When the data is returned from the various memory locations of a RAID group (which may be, for example, chips, circuit packages, or modules), all of the data in a RAID group that belonged to the same write operation will then have the same SeqNum.

The BDU, in this example, comprises 1 KB of data, and associated auxiliary data. The SeqNum may be returned on the same data path as the data when performing a read operation. The SeqNum may also be returned on this data path, for example, when acknowledging (acking) the receipt of data that is to be written to memory.

The SeqNum may be set at the time that the command to write the IKB data of the BDU to the NVS is issued. A use of the SeqNum may be to rebuild and to resynchronize the memory locations of a RAID group if they become inconsistent, a situation which may obtain during a dirty shutdown. The SxS bit in the location field may be set until the MTE has been checkpointed to NVS, so that the associated SeqNum will not be re-used during the recovery process.

A 2block is comprised of 512 BDUs for which the following information may be available: the state; a 64-bit BDU live status bit map; the number of free BDUs, and the number of live BDUs, represented by 2 bytes each; the PSN of the CPB, represented by 5 bytes; a 3 byte erase count; a 3 byte read count; an error count [max_bits] 3 bytes/1 byte; and, an average programming time (3 bytes). Max_bits represents the largest number of bits which were detected as being in error by the ECC at any one time. Since the ECC can only correct a certain number of errors, it may be useful to know how many error bits have been encountered so that the data can be moved to a new memory location before the number of error bits is to large to be corrected by the ECC. Other data that may be useful to record may be the average erase time, and the maximum times for programming and erasing, which may vary over the life of the part.

Two types of Checkpoint Blocks (CPB) may be used: a Block Table (BT) CPB and Mapping Table (MT) CPB.

The BT-CPB may have 8 entries for each BDU, and 64 entries for each ODU. Each data block may contain 512 BDU, so a BDU in the BT-CPB containing 8 entries checkpoints the BT structures representing 4K data BDUs, holding 4 MB of data, and the 64 entries in an ODU hold the BT structures representing 32K data BDU or 32 MB of data. The Block Tables (BT) may be checkpointed into the NVS on a periodic basis during normal operation. For example, 20 ODU BTs, representing 1280 2Blocks may be checkpointed into NVS each second. During a normal shutdown, the BTs in volatile memory may be checkpointed into memory at a faster rate until all of the BTs have been checkpointed.

Where the BTs are periodically checkpointed as described above, a full checkpoint of the BTs is approximately proportional to the memory size being managed. For example, at the rate of checkpointing stated above, a full checkpoint of BTs for a 32 GByte memory may be performed every 50 seconds. The time to checkpoint larger memory systems would be proportional to the amount of memory in the system so that, for example, a 512 GB memory system would be checkpointed in 13 minutes.

A Map Table CPB may, for example, contain 128 entries per BDU, and 1K data entries for each ODU, and 160MT ODU may be checkpointed each second. Thus, a full checkpoint of the MT CPBs may be performed in 204 seconds for a 32 GB memory, and a 512 GB memory would be checkpointed every 54 minutes.

Each checkpoint block spare area may have additional information, as shown in FIG. 20D, where a field type byte indicates the type of CPB, and 0xF2 indicates a BT CPB and 0xF4 indicates a MT CPB. Further, the variable SAF0 is an index of the first entry in a BDU, and SAF1 may be the block erase count.

The Map Table (MT) provides for the memory addressing information. Secondary tables (one per 128 MTEs) may contain "active" descriptors and a PSN. The "active" descriptors may indicate how many of the MTEs in the range [128*i, 128*i+127] and have a type V8 location field, where the data is in volatile memory (e.g., RAM) and will have to be de-referenced when being checkpointed. The PSN[i] of the CPB containing MTEs in the range [128*i, 128*i+127] can be used for log replay sequencing during a system recovery.

The Log Block (LB) is comprised of 16 byte entries so that there are 256 entries for each BDU of the LB. All entries in a BDU should be filled, so as to avoid ambiguities. As such, padding entries may be used to program unused memory locations in the BDU during shutdown, or where an immediate write of the BDU to NVS may be desired, such as when a bad block entry is made. The LB entry types are: MTE (0x1); CPB write (0x2); block erase (0x3); block assign (0x4); bad block (0x5); and not programmed (0x7). The indicator 0x6 is reserved.

The LB entry representing a MTE is shown in FIG. 20. Word A may be the physical location of the BDU prior to the programming (write) action resulting in this LB entry. Word B may be the index of the logical block (LBA) that is being written. Words C and D are the MTE for the LBA being written. Thus the LB entry links the previous physical memory location of a LBA with the new physical memory location of the LBA.

When a CPB is being written, the LB entry is as shown in FIG. 21. Word A is the physical location of the CPB BDU that is being written; word B is the index value of the first entry in the BDU, which may be used as a validity check to determine that the correct data is being read (any other check data may be substituted, such as a CRC over the BDU, or may be omitted depending on the data reliability requirements of the system); word C contains a one byte type field, and the first byte of the PSN; and, word D contains the last four bytes of the PSN associated with the CPB BDU.

The LB entry representing a block erase operation is shown in FIG. 23. Word A is the index value of the first BDU in the block of NVS being erased (another check data may be substituted, such as a CRC over the BDU, the PSN of the first BDU, or the like; these values allow a confirmation that the block was erased by determining that the current data does not match the check data, thus indicating that the old, pre-erase, data has been replaced); word B is reserved; word C has a single byte indicating the type of block that was erased, and the first byte of the PSN; and, word D has the last four bytes of the PSN.

As mentioned above, in this example, but not as a limitation, each block may contain one type of data: index, log, checkpoint, or user data. While this may indeed be the result of a specific design, the limitation here is made so as to merely to simplify the presentation.

The LB entry for a block assignment operation is shown in FIG. 24. Word A is the index value of the first BDU in the block; word B is the index value of the first entry in the block (if applicable); word C has one byte representing the new block type, one byte representing the old block type, and the first byte of the PSN; word D has the last four bytes of the PSN.

The LB entry for a bad block is shown in FIG. 22E. This entry is made two times. The first entry is made when a bad block is detected. The remainder of the LB is then padded to completion, and written to NVS immediately. Once all of the BDUs in the bad memory block have been relocated another entry is made. The entry may differ in that the first entry uses the current block type as the block type, while the second entry uses the bad block type as an indicator. Word A is the index value of the first BDU in the bad memory block; word B is the index value of the faulty page if the defect is a page program (write) failure, and all "1" if the defect is a block erase failure. Read errors are 'normal' when currently available flash memories are used and are corrected by the ECC; the number of errors may be stored in the block table. Blocks may not declared bad because of read errors, but as a result of program or erase errors. Word C contains the one byte block type indicator and the first byte of the PSN; and, word D contains the last 4 bytes of the PSN.

The LB entry during a pad operation is all zeros, as shown in FIG. 25. This permits a fixed content ODU to be rapidly written to the NVS. With the NVS memory circuit being used in this example, this permits an ODU to be padded in about 25 us, rather than about 400 us when a write is performed over the bus.

The LB spare area is shown in FIG. 22. The unique aspects of the LP spare area are that the type field is 0xF8 indicating that this is a LB; the value of SAF0 is the number of entries in the LB; and, the value of SAF1 is the block erase count.

Having established the data structures and performed the operations for checkpointing the metadata and log to NVS, a recovery or restart can be performed from the point of shutdown, or from the point of the crash, if the shutdown was dirty.

When the system is initialized, reset, or otherwise restarted, the MT and the BT are read from the NVS (e.g., flash) to the volatile storage (e.g., RAM), and the location (LogStart) of the log block address (LBA) having the smallest PSN greater than the smallest PSN of any entry in the MT or the BT is determined. any Entries in the log with a PSN smaller than all of the entries in both the MT and BT tables of the latest checkpoint are not needed for recovery the previous transactions were fully reflected in the MT and BT that were read from NVS, the log recovery starts at the location (LogStart) of the BDU in the log having the smallest PSN greater than the smallest PSN of any entry in the MT or the BT.

Aspects of the process for this example may be described in pseudocode as:

```
L = LogStart
    While (L!=NULL) & (L.PSN >= LogStart.PSN) {
        /* while the Log BDU pointed to is not NULL (not erased)
and the PSN of the BDU is larger than (that is, more recent than) the PSN
of the beginning of the log, process the entries in the BDU: since the Log
is circular, as L moves along the log L will eventually wrap around and,
if the BDU pointed to had not been erased, the BDU will have an earlier
PSN than the beginning of the Log and this will indicate that the whole
log has been processed */
        For I = 0 to 63
            If L.E[I].Type != 0 Process_LE(L,I) /* process
any non-pad entries */
        L= NextLogEntry(L) /* advance to the next BDU of the Log,
when the end of a Log Block is reached find the next Log Block and start
at the beginning of that block. This step assumes that the log is written
sequentially, one block after another; however, for example, if the log
had been striped across more than one block at a time, or otherwise
written in a manner which steps through the memory sequentially one
block at a time, then NextLogEntry would advance according to the
layout policy that was used. */
    }
    Process_LE(L,I){
        E = L.E[I];
        T = E.PSN
        Switch(L.E[I].Type){
            Case MTE:     /* Handle a change in location of a data BDU,*/
                /* extract the various fields of the log entry
                OldLoc is the physical location the BDU was in before this
update, if the BDU was not previously used, or had been stored only as a
pattern in the MT then the OldLoc would be set to an invalid address
such as 0
                NewLoc is the location the BDU is being written to, if the BDU
is not being written to NVS for some reason such as being deallocated or
being saved as a pattern in the MT then NewLoc would be set to invalid
address such as 0
                LBI is the Logical Index of the BDU being written that this entry
refers to */
                OldLoc = E:Bits[0-28];
                NewLoc = E:Bits[64-92];
                LBI = E:Bits[32-60];
                /* get the Block Table entries for the new and old locations of the
BDU */
                OB = BT[ (OldLoc / BlockSize)]
                NB = BT[ (NewLoc / BlockSize)]
                /* if the new or old location of the BDU was in NVS, and the
Block Table entry in NVS is older than the log entry then add or remove
that entry from the in memory BT data structures, and perform whatever
other processing is appropriate, such as moving the block to the free list if
it is empty or removing it from the list of blocks available to be written to
if it is full, etc */
                If (OldLoc != 0) & (T > OB.PSN) { Remove(OB, OldLoc) }
                If (NewLoc != 0) & (T > NB.PSN) { Add(NB, NewLoc) }
                /* if the PSN in NVS of the MT containing the BDU is older than
the log entry, update the in-memory MT by setting the PSN based on data
in the log entry */
                If T > PSN[LBI/128] {
                    MT[LBI]= E:Bits[64-127]}
                }
                Break;
            Case Block_Write:
/* May be used to simplify housekeeping, for example, by
indicating that required updates from changing the type of a block, such
as updating of an Index Block to point at block which was just allocated
to be a Log Block were written to NVS so that it is not necessary to
inspect the Index Block to see if it was updated. In general this may be
used anytime confirmation of a write to the NVS is required or is
helpful */
                Break;
            Case Block_Erase;
                B=E:Bits[0:27]; /*Index of block being erased */
                If (T > BT[B].PSN) { /* block was erased after its BT entry was
check pointed */
                    Process_Block_Erase(B); /* handle all data structure
housekeeping usually performed after a block erase, clear the live bit
field, increment the erases count, move the entry to the free list, etc */
                Break;
            Case Block_Assign;
                B=E:Bits[0:27]; /*Index of block being assigned */
                If (T > BT[B].PSN) { /* block was assigned a new type after its
BT entry was check pointed */
                    Process_Block_Assign(B); /*handle all data structure
housekeeping performed after the type of a block is changed, may
involve adding or removing the block from various lists. If the block was
changed to or from a Check Point Block or Log Block then the Index
Blocks (if used) may need to be updated. If the block was changed to or
from an Index Block then the Root Blocks (if used) may need to be
updated. A check should be performed to see if the block already was
updated */
                }
                Break;
            End Switch;
```

The pseudocode above is but one of many such process detail fragments which may have been given to explain aspects of the example and is not intended to be limiting.

After processing of the log, the location of the last data written into each block as of the writing of the log will be determined; then each block is checked to see if there is additional data present that was written after the last log entry. If BDUs are found that are more recent than the entries stored in the MT for the LBA of the discovered BDU, then MT is updated to reflect the new location of the data, and the new and old BT entries are updated accordingly. In the case that the sequence number set flag is set in the discovered BDU then the MTE sequence number may not be used to determine which BDU is more recent, the discovered one or the one currently pointed to by the MT entry for that LBA, and the PSNs of the BDU in NVS representing the same LBA have to be compared to determine which data is more recent. If the size of the PSN is small enough that the PSN could wrap around during the lifetime of the storage system then some form of scrubbing should be employed to move BDUs whose PSNs are old enough that there is a possibility of being unable to correctly determine the relative age of different BDUs having data for the same LBA during a recovery operation.

It is therefore intended that the foregoing detailed description be regarded as illustrative rather than limiting, and that it be understood that it is the following claims, including all equivalents, that are intended to define the spirit and scope of this invention.

What is claimed is:

1. A method of operating a memory system, the method comprising;
    storing data in a non-volatile memory;
    maintaining a checkpointed copy of a dynamic table of metadata for the stored data in the non-volatile memory;
    maintaining a transaction log for the dynamic table;
    discovering changes to the dynamic table that are not found in the transaction log;
    updating the dynamic table by applying transactions in the transaction log and the discovered changes,
    wherein at least one of a portion of the transaction log or a portion of the dynamic table is stored in a volatile memory.

2. The method of claim 1, wherein a sequence number is assigned sequentially to each change of the dynamic table.

3. The method of claim 1, wherein the dynamic table is metadata representing at least a base memory address of data written to each of a minimum writable memory circuit address range.

4. The method of claim 1, wherein the dynamic table contains metadata data for a plurality of blocks, each block comprised of sectors.

5. The method of claim 1, wherein a checkpointed transaction log in the non-volatile memory is maintained by writing contents of a most recent segment of a volatile transaction log to a transaction log in the non-volatile memory.

6. The method of claim 1, wherein a size of the transaction log in the non-volatile memory is sufficient to maintain a record of the transactions affecting the dynamic table since the last time that each segment of the dynamic table has been checkpointed to the non-volatile memory.

7. The method of claim 1, wherein the non-volatile memory is NAND FLASH memory.

8. The method of claim 1, wherein the metadata relates a logical block address to a physical sector address in the non-volatile memory and the dynamic table is maintained in the non-volatile memory by checkpointing in portions.

9. The system of claim 8, wherein dynamic table contains the metadata including a mapping of logical address to physical address and an index value for a writable data area of the non-volatile memory index the value representing the highest writable data area of a block of the non-volatile memory to which data has been written.

10. The method of claim 1, wherein user data written in NVS is written using a RAID algorithm.

11. The method of claim 10, wherein dynamic table data contains a sequence number of the RAID data.

12. The method of claim 1, wherein the dynamic table and the transaction log are check pointed to non-volatile storage in segments.

13. The method of claim 12, wherein each segment of the dynamic table is checkpointed before the same segment is checkpointed again.

14. The method of claim 12, wherein each segment of the dynamic table is checkpointed when a predetermined number of changes have been made to the contents of the segment.

15. The method of claim 12, wherein each segment of the dynamic table is checkpointed after a predetermined elapsed time since the last checkpoint.

16. The method of claim 1, wherein spare data for discovered changes is written to a recovery log.

17. The method of claim 16, wherein the spare data are ordered in the recovery log by a transaction sequence number extracted from the spare data.

18. The computer program product of claim 17, wherein the block cannot be erased until the data of all sectors in the block having live data has been relocated to free sectors of another block.

19. The method of claim 17, wherein the ordered spare data are used to update the dynamic table by applying the transaction information contained in the spare data.

20. The computer program product of claim 19, wherein when data of a sector location is modified, a sector location of the modified data is changed that of a free page to which the modified data is written and the sector location from which the modified data has been moved is marked as a dead page.

21. The method of claim 1, wherein the checkpointed copy of the dynamic table is read from the NVS to the volatile memory.

22. The method of claim 21, wherein the dynamic table includes an index value for a block of the non-volatile memory, the index value being the highest incremental value of a sector number of the block written with data.

23. The method of claim 22, wherein the sector is a plurality of sectors.

24. The method of claim 22, wherein the sector corresponding to the index value for the block is inspected.

25. The method of claim 22, wherein operation of the non-volatile memory is constrained such that data is written to each block of the non-volatile memory in a sequential manner.

26. The method of claim 22, wherein discovering changes includes the step of inspecting the block to determine if data has been written to a sector having an index value greater than the index value of the block.

27. The method of claim 26, wherein an indication that data has been written to the sector is that the data bits are other than all "1".

28. The method of claim 26, wherein an indication that data has been written to the sector is that the data bits of the spare data area of the sector are other than all "1".

29. The method of claim 26, wherein discovering changes includes the step of inspecting at least a lowest numbered sector of each block to determine if the block has been erased since a checkpoint of the transaction log.

30. The method of claim 26, wherein the discovered changes include spare data.

31. The method of claim 30, wherein the spare data includes the logical block address of the data, and a transaction sequence number.

32. The method of claim 31, wherein when the sector contains an indication that the block has been erased by an erase transaction, a free sector table is updated.

33. The method of claim 30, wherein the spare data includes a previous sector address of the data.

34. The method of claim 33, where four (4) sectors are a page, and the discovered changes are with respect to the page of data.

35. A system for storage of data, the system comprising:
a volatile memory device;
a non-volatile memory; and
a processor in communication with the volatile memory device and the non-volatile memory device,
wherein the processor is configured to maintain a dynamic table in volatile storage representing data stored in the non-volatile memory, a checkpointed version of the dynamic table in the non-volatile memory, and a log representing transactions affecting stored data, and to repair the dynamic table by discovering data written to the non-volatile memory between the last update of the log and a time of repair.

36. A computer program product, stored or distributed in or on a non-transient computer readable medium, comprising instructions for:
configuring a processor and memory system to maintain metadata in a volatile memory representing data stored in a non-volatile memory;
maintaining a checkpointed version of the metadata for the stored data in the non-volatile memory and a transaction log; and
discovering changes to the transaction log repairing the metadata by:
applying the transactions of the transaction log to the metadata to update the metadata;
discovering a transaction written to the non-volatile memory where the transaction log in the non-volatile memory had not been updated to include the transaction; and
applying the discovered transactions to update the metadata.

37. The computer program product of claim 36, wherein the metadata includes an index value representing a highest sector location that has data written thereto in a block of the non-volatile memory.

38. The computer program product of claim 36, where the discovered transactions are arranged in an ordered sequence prior to the step of applying.

39. The computer program product of claim 38, wherein the discovered transaction includes determining whether a block of data of the non-volatile memory has been erased and the transaction has not been recorded in the checkpointed metadata or the transaction log, and updating the metadata.

40. The computer program product of claim 36, wherein the metadata includes a listing of free blocks.

41. The computer program product of claim 40, wherein a free block is comprised of all free sectors.

42. The computer program product of claim 41, wherein data is written to free sectors of a block in order of increasing index value.

43. The computer program product of claim 42, wherein when data is written to the free sector, the sector is considered to have valid data and the sector cannot be written to again until the block has been erased.

44. A method of operating a memory system, the method comprising;
   storing data in a non-volatile memory;
   maintaining a checkpointed copy of a dynamic table of metadata for the stored data in the non-volatile memory;
   maintaining a transaction log for the dynamic table;
   discovering changes to the dynamic table that are not found in the transaction log;
   updating the dynamic table by applying transactions in the transaction log and the discovered changes,
   wherein at least a portion of the transaction log is stored in a volatile memory.

* * * * *

UNITED STATES PATENT AND TRADEMARK OFFICE
CERTIFICATE OF CORRECTION

| | | |
|---|---|---|
| PATENT NO. | : 8,452,929 B2 | Page 1 of 1 |
| APPLICATION NO. | : 12/273410 | |
| DATED | : May 28, 2013 | |
| INVENTOR(S) | : Jon C. R. Bennett | |

It is certified that error appears in the above-identified patent and that said Letters Patent is hereby corrected as shown below:

In the Claims

In column 33, claim 9, line 16, after "claim 8, wherein" insert --the--.

In column 33, claim 9, line 19, immediately after "memory index" insert --,--.

In column 33, claim 12, line 28, after "transaction log are" replace "check pointed" with --checkpointed--.

In column 33, claim 20, line 54, after "data is changed" insert --to--.

In column 34, claim 36, line 54, immediately after "transaction log" insert --;--.

In column 34, claim 36, line 54, after "transaction log" start a new paragraph with the words "repairing the".

Signed and Sealed this
Twenty-fourth Day of June, 2014

Michelle K. Lee
*Deputy Director of the United States Patent and Trademark Office*